United States Patent
Ikeda et al.

(10) Patent No.: US 8,719,950 B2
(45) Date of Patent: May 6, 2014

(54) ACCESS CONTROL APPARATUS AND STORAGE MEDIUM

(71) Applicants: Tatsuro Ikeda, Fuchu (JP); Koji Okada, Tokyo (JP); Norikazu Hosaka, Fuchu (JP); Toshio Okamoto, Tokyo (JP)

(72) Inventors: Tatsuro Ikeda, Fuchu (JP); Koji Okada, Tokyo (JP); Norikazu Hosaka, Fuchu (JP); Toshio Okamoto, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 0 days.

(21) Appl. No.: 13/692,351

(22) Filed: Dec. 3, 2012

(65) Prior Publication Data

US 2013/0097665 A1    Apr. 18, 2013

Related U.S. Application Data

(63) Continuation of application No. PCT/JP2011/062623, filed on Jun. 1, 2011.

(30) Foreign Application Priority Data

Jun. 3, 2010   (JP) ................................. 2010-128188

(51) Int. Cl.
    *H04L 9/32*       (2006.01)
(52) U.S. Cl.
    USPC .......................................................... 726/27
(58) Field of Classification Search
    USPC .......................................................... 726/27
    See application file for complete search history.

(56) References Cited

U.S. PATENT DOCUMENTS

| | | | |
|---|---|---|---|
| 8,302,205 B2 * | 10/2012 | Kanai | 726/27 |
| 8,365,298 B2 * | 1/2013 | Kerschbaum et al. | 726/27 |
| 2004/0167984 A1 * | 8/2004 | Herrmann | 709/229 |
| 2005/0004887 A1 | 1/2005 | Igakura et al. | |
| 2005/0289150 A1 | 12/2005 | Kudo | |
| 2010/0043070 A1 * | 2/2010 | Okada et al. | 726/21 |

FOREIGN PATENT DOCUMENTS

| | | |
|---|---|---|
| JP | 2001-306521 | 11/2001 |
| JP | 2005-25524 | 1/2005 |
| JP | 2006-12033 | 1/2006 |
| WO | WO 2006/001153 A1 | 1/2006 |
| WO | WO 2009/057652 A1 | 5/2009 |

OTHER PUBLICATIONS

International Preliminary Report on Patentability and Written Opinion issued Jan. 17, 2013 in Application No. PCT/JP2011/062623.

(Continued)

*Primary Examiner* — Krisna Lim
(74) *Attorney, Agent, or Firm* — Oblon, Spivak, McClelland, Maier & Neustadt, L.L.P.

(57) ABSTRACT

According to one embodiment, an access control apparatus suspends the resource access event prior to access of the resource access device when the resource access event is started. The access control apparatus acquires attribute information from the attribute management device by using the deny-type policy in the access control policy and decides the permission or the denial of the access based on this attribute information and the deny-type policy. The access control apparatus releases the suspension when a result of decision in the supplied access decision result is indicative of the permission and no obligation-type policy is present in the access decision response.

4 Claims, 14 Drawing Sheets

(56) References Cited

OTHER PUBLICATIONS

International Search Report mailed Jul. 5, 2011, in PCT/JP2011/062623 filed Jun. 1, 2011 (with English Translation).

International Written Opinion mailed Jul. 5, 2011 in PCT/JP2011/062623 filed Jun. 1, 2011.

Tim Moses, "eXtensible Access Control Markup Language (XACML) Version 2.0", Oasis Standard, Feb. 1, 2005, 141 pages.

* cited by examiner

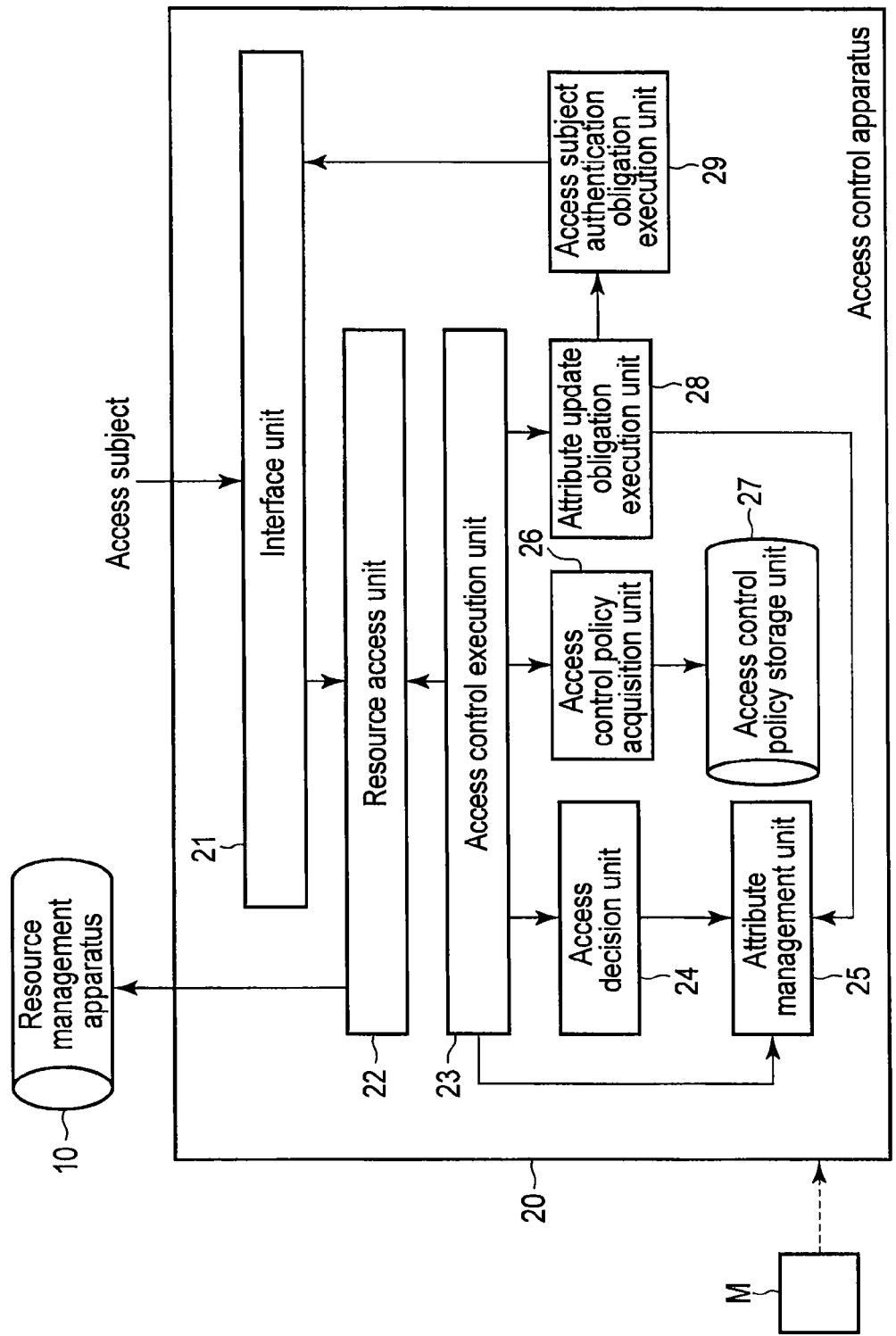
F I G. 1

Access decision request

```
<Request>
  <Subject/>
  <Resource>
    <Attribute AttributeId="resource:resource-id">
      <AttributeValue>
        resource0001
      </AttributeValue>
    <Attribute>
  </Resource>
  <Action>
    <Attribute AttributeId="action:action-id">
      <AttributeValue>
        Read
      </AttributeValue>
    <Attribute>
  </Action>
  <Environment/>
</Request>
```

} Subject is not set

} Resource identifier is resource0001

} Action identifier is Read

} Environment is not set

FIG. 2

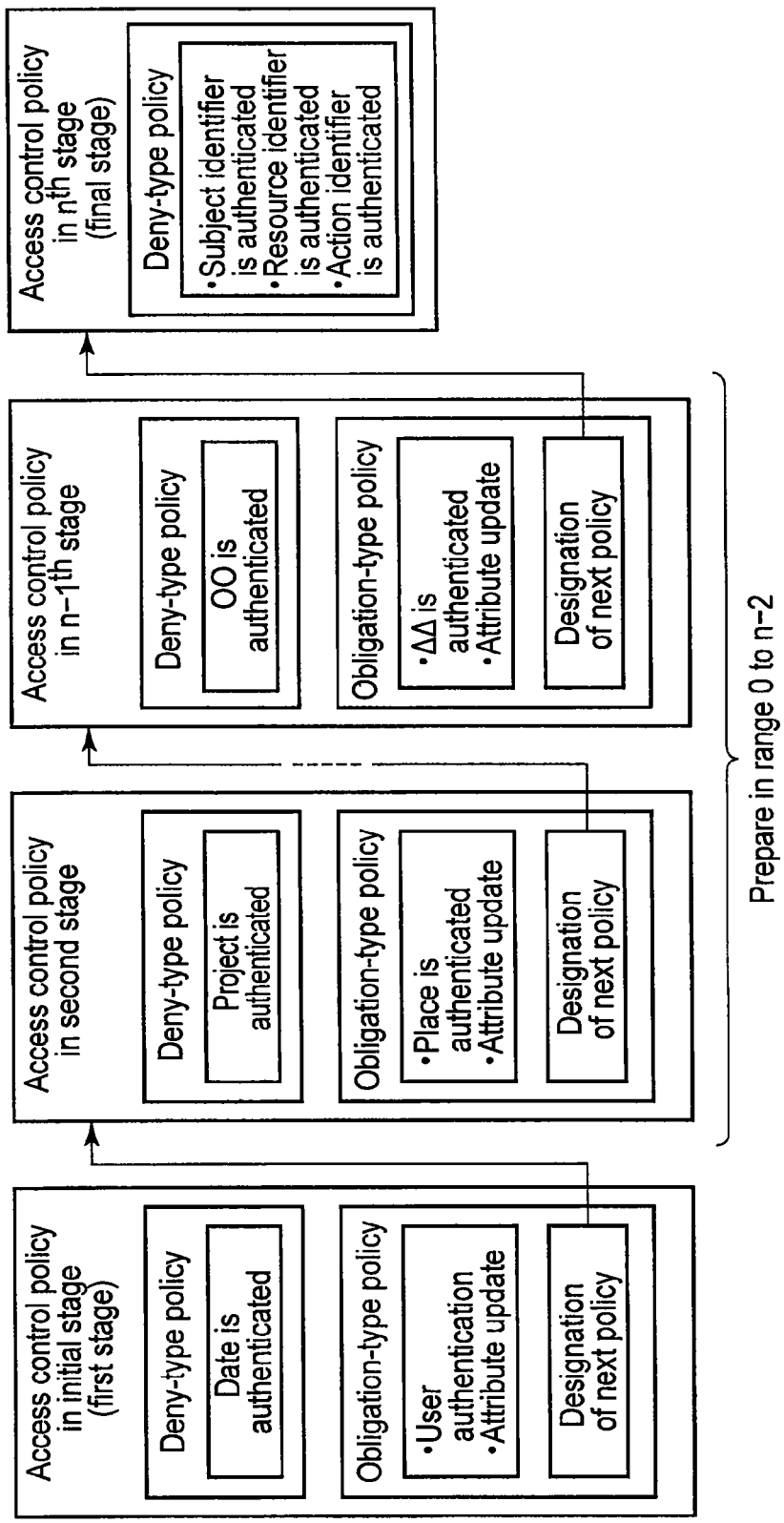
F I G. 3

```
        <Resources>
        <Resourcs>
        <ResourceMatch MatchId="function:string-equal">
          <AttributeValue
           DataType="http://www.w3.org/2001/XMLSchema#string"
            resource0001
          </AttributeValue>
          <ResourceAttributeDesignator
           DataType="http://www.w3.org/2001/XMLSchema#string"
            AttributeId="resource:resource-id" />
         </ResourceMatch >
        </Resource>
       </Resources>
       <Actions>
        <Action>
         <ActionMatch MatchId="function:string-equal">
          <AttributeValue
           DataType="http://www.w3.org/2001/XMLSchema#string"
            Read
          </AttributeValue>
          <ActionAttributeDesignator
           DataType="http://www.w3.org/2001/XMLSchema#string"
            AttributeId="action:action-id" />
         </ActionMatch>
        </Action>
       </Actions>
      </Target>
     </Rule>
     </Rule Effect="Deny"RuleId="deny-all-others">
    </Policy>
   </PolicySet>
```

As resource, resource0001 coincides with resource identifier

As action, read coincides with action identifier

Rule 2 whose effect is permission

Rule whose effect is denial: other rules all represent denial

F I G. 8

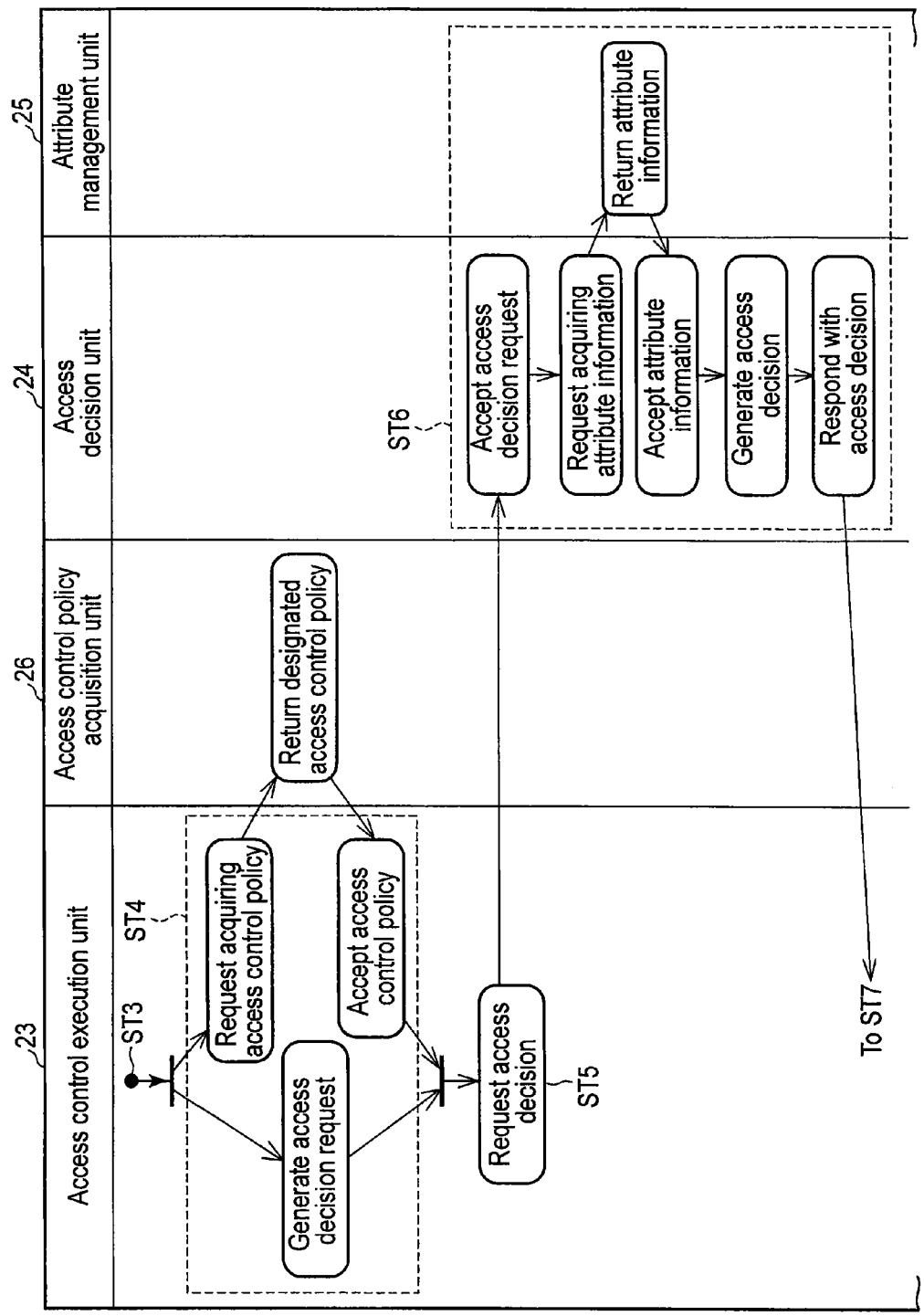
F I G. 9

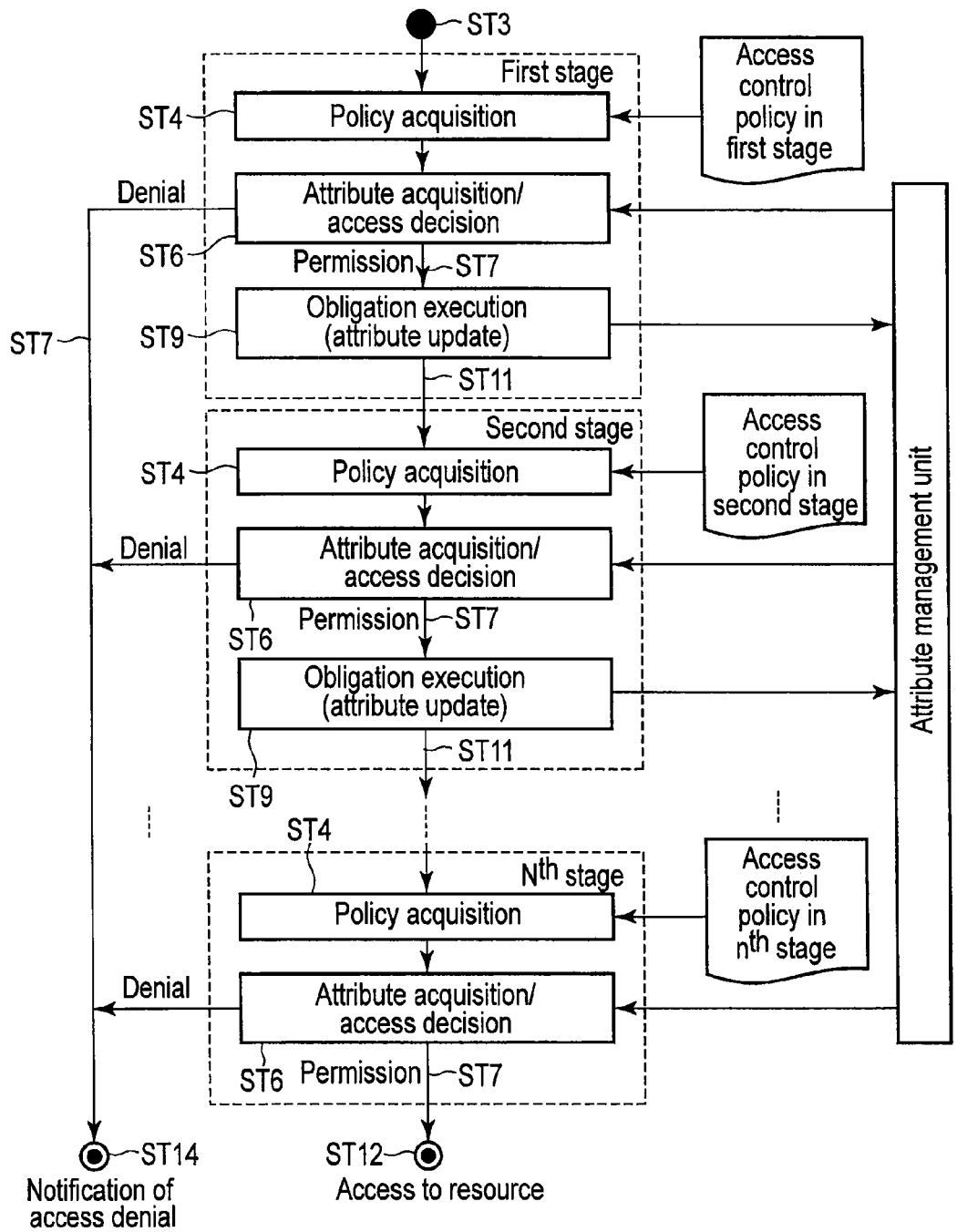
F I G. 11

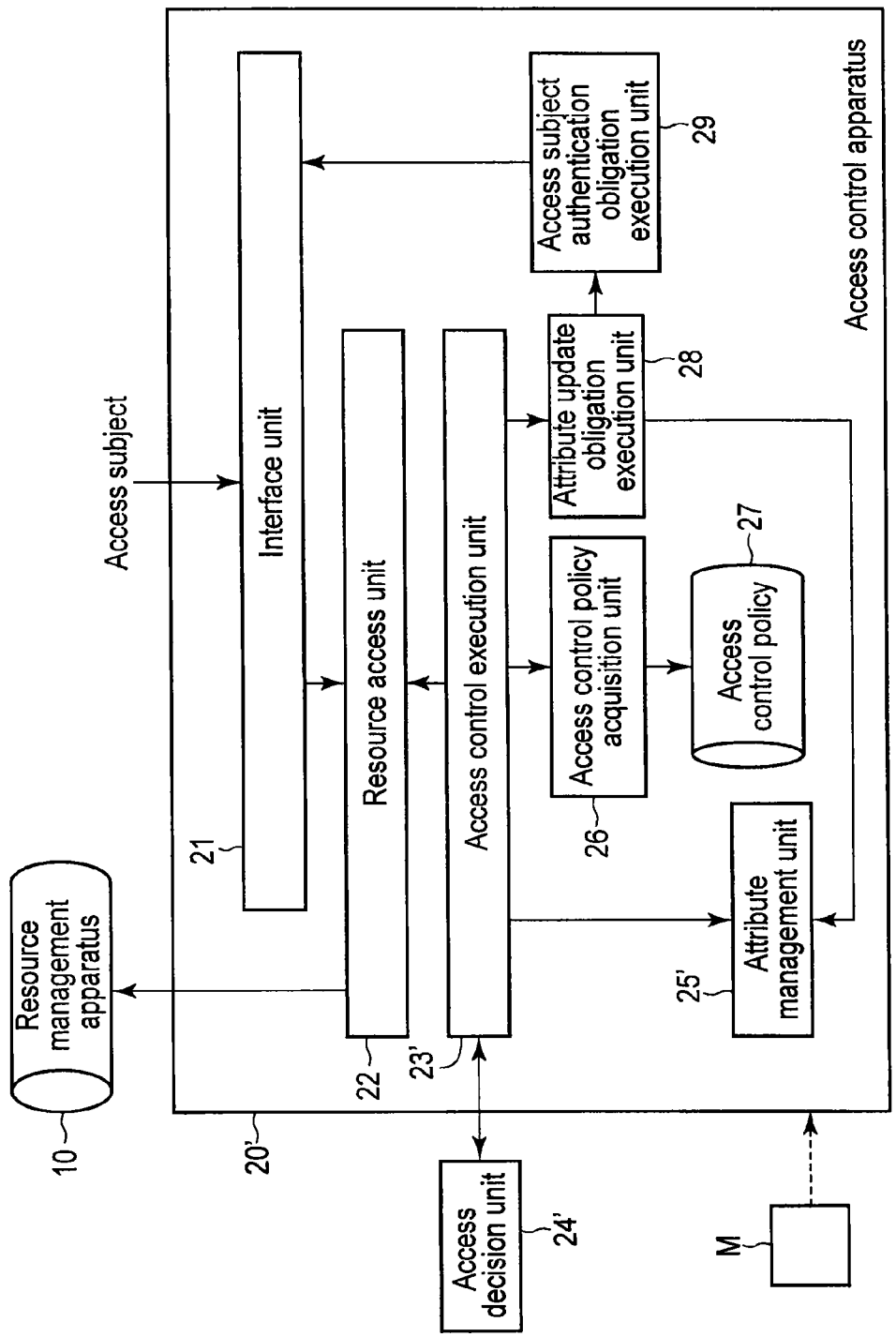
F I G. 12

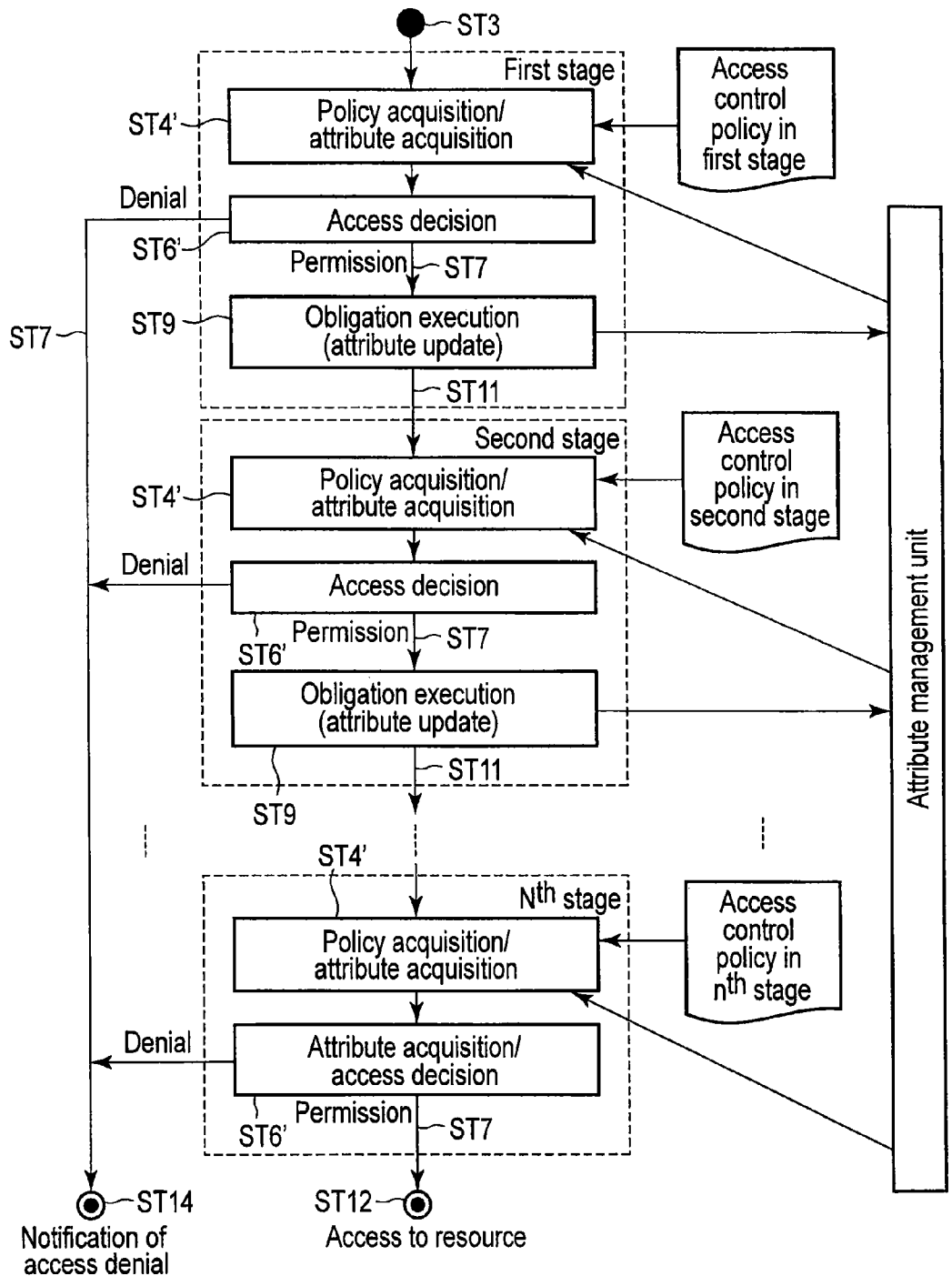
F I G. 14

ACCESS CONTROL APPARATUS AND STORAGE MEDIUM

CROSS REFERENCE TO RELATED APPLICATIONS

This application is a Continuation application of PCT Application No. PCT/JP2011/062623, filed Jun. 1, 2011 and based upon and claiming the benefit of priority from prior Japanese Patent Application No. 2010-128188, filed Jun. 3, 2010, the entire contents of all of which are incorporated herein by reference.

FIELD

Embodiments described herein relate generally to an access control apparatus and a storage medium.

BACKGROUND

In recent years, the importance of access control technology that controls specific information or actions based on authorization information is growing. For example, action-based access control is used extensively.

As the action-based access control, for example, there is a method that uses authorization information for a document file as a security attribute. According to this method authorization information for a document file is written in an action propriety format such as "read permission" or "edit permission", and the authorization information is assigned to a user. This type of authorization information is known as an access control matrix or an access control list.

However, in action-based access control, it is difficult to write conditions such as a permitted access time or an access site or detailed and flexible access control contents such as detailed functional limitation.

Therefore, in recent years, not only action-based but also access-control-policy-type access control is used. The access control policy is a set of access control rules, and standard descriptive specifications are released. In the access-control-policy-type access control, conditions of decision criteria or functional limitation can be written in detail. As a result, in the access-control-policy-type access control, upon receiving a request for accessing information, various kinds of attribute information are acquired from an access requester, the acquired information is compared with conditions of decision criteria, whether a file can be opened is decided, and control such as limiting to a function designated in the access control policy is enabled. Such a technology is also generally called digital rights management.

However, although a mechanism that acquires various kinds of attribute information is independent from an access control mechanism. For example, user authentication or the like is also a part of the acquisition of the attribute information, but an authentication policy for deciding an authentication method for an access subject is often used aside from the access control policy.

In contrast, at the present, selectivity of attribute information has been demanded. Taking authentication as an example, what is demanded is selecting attribute information from various authentication elements, authentication methods, and authentication executors and changing the authorization of an access subject in accordance with executed authentication. For example, a method or a level of authentication may be changed in accordance with an importance degree of a resource which is an access control target in some cases. The authorization of an access subject may be changed in accordance with attribute information concerning an environment such as a conformation of connection to services, a connection site, a connection time, and others besides the attribute information concerning the authentication of a user in some cases.

However, a method of deciding attribute information to be acquired is generally implicitly known. Further, in an access control system, it is often the case that access decision is executed only once. In this case, assuming that the attribute information to be acquires is implicitly know, all items of attribute information that are possibly required for the access decision are acquired, which is inefficient.

Furthermore, when items of exclusive and selective attribute information are present, for example, when a concurrent authentication state provided by items of authentication processing is prohibited, non-selected attribute information cannot be acquired, and the access decision cannot be executed.

Therefore, in an information system, when items of exclusive and selective attribute information are present, the attribute information is selected in a rigid and restricted way, and the access decision is executed, whereby authentication concerning non-selected attribute information is omitted and the simplified access control is executed. However, the simplified access control can be a cause that increases a risk such as leakage or impairment of information.

A problem to be solved by the present invention is to provide an access control apparatus and a storage medium that can efficiently realize advanced access control even if items of exclusive and selective attribute information are present.

BRIEF DESCRIPTION OF THE DRAWINGS

FIG. 1 is a schematic view showing an access control apparatus and its peripheral configuration according to a first embodiment;

FIG. 2 is a schematic view showing a structural example of an access decision request in the first embodiment;

FIG. 3 is a schematic view showing a structural example of an access control policy in the first embodiment;

FIG. 8 is a schematic view showing the structural example of the access control policy in the final stage according to the first embodiment;

FIG. 9 is a schematic view for explaining an operation according to the first embodiment;

FIG. 11 is a schematic view for explaining a modification of the first embodiment;

FIG. 12 is a schematic view showing an access control apparatus and its peripheral configuration according to a second embodiment;

FIG. 14 is a schematic view for explaining a modification according to the second embodiment.

DETAILED DESCRIPTION

Figure 4:
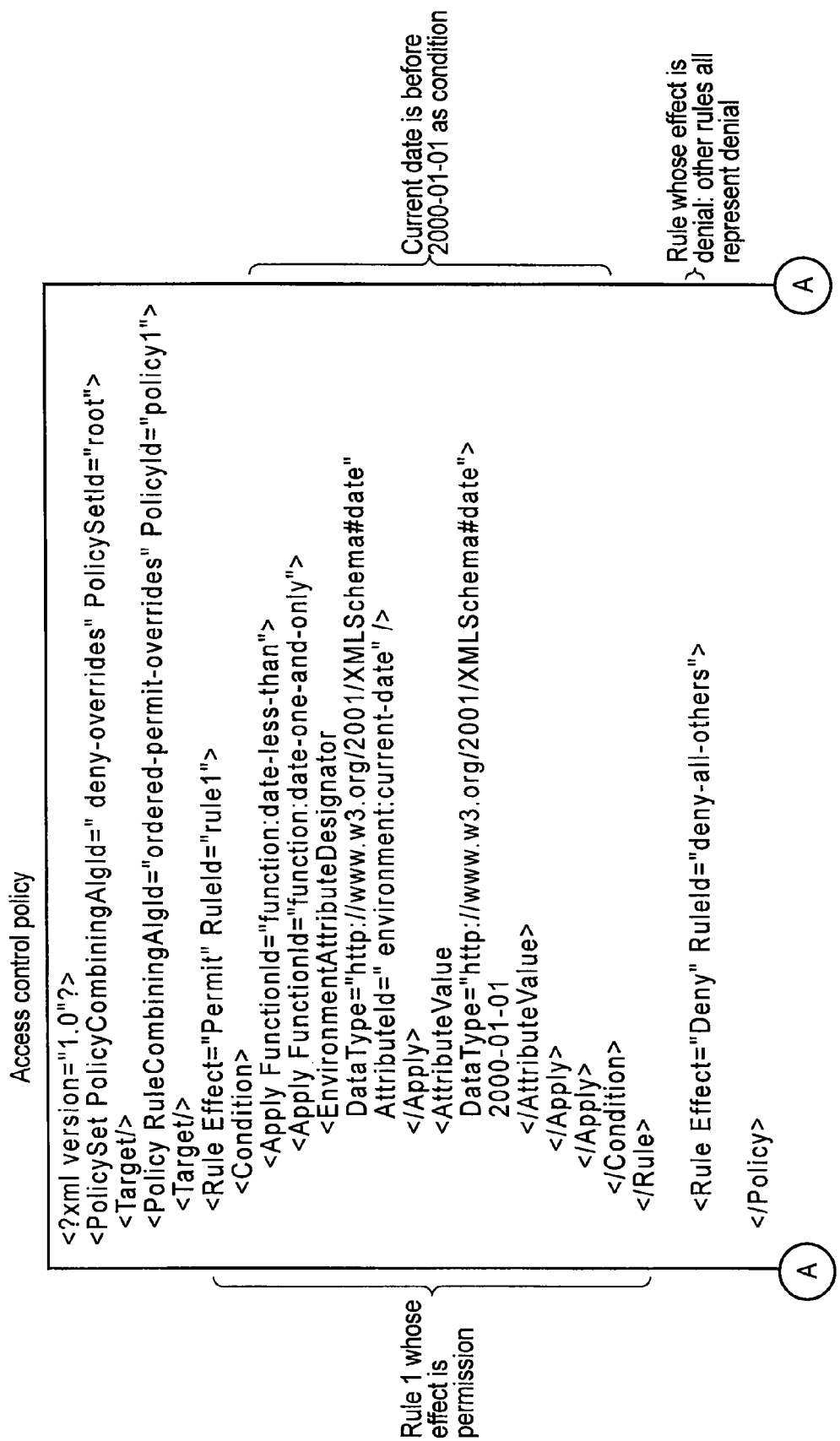
FIG. 4 is a schematic view showing a structural example of an access control policy in an initial stage according to the first embodiment.

In general, according to one embodiment, an access control apparatus controls access to a resource formed of a document file or an operation execution unit as a control target. The access control apparatus comprises attribute management device, first policy storage device, second policy storage device, request acceptance device, access event starting device, resource access device, suspension device, decision request generation device, policy acquisition device, first supply device, access decision device, second supply device, third supply device, obligation execution request device, access subject authentication device, fourth supply device, designation device, release device, and cancellation device.

The attribute management device updates and stores items of attribute information each including at least a value of a current date and a value of an access subject identifier.

The first policy storage device stores one or more access control policies each including a deny-type policy which represents permission when attribute conditions and an acquisition source of any attribute information are written and the attribute information acquired from attribute management device which is the acquisition source meets the attribute conditions or represents denial when the permission is not presented and an obligation-type policy in which obligation information including designation of an obligation execution subject, an obligation action, and an access control policy in a subsequent stage is written.

The second policy storage device stores an access control policy which is designated in any obligation information, has attribute conditions including a value of a resource identifier, a value of an action identifier, and a value of an access subject identifier, a resource identifier and an action identifier read from an access decision request, and an access subject identifier read from the attribute management device previously written therein, includes a deny-type policy which represents permission when a value of the resource identifier, a value of the action identifier, and a value of the access subject identifier that are read coincide with the attribute conditions or represents denial when the permission is not represented, and does not include an obligation-type policy.

The request acceptance device accepts an access request including a value of a resource identifier indicative of the resource and a value of an action identifier indicative of access request contents with respect to the source.

The access event starting device starts a resource access event that is required for accessing the resource based on the accepted access request.

The resource access device accesses the resource based on the access request if the started resource access even is not suspended or canceled.

The suspension device suspends the resource access event prior to access of the resource access device when the resource access event is started.

The decision request generation device acquires an access request from the resource access device and generates an access decision request including the access request during this suspension.

The policy acquisition device acquires an access control policy in an initial stage designated in association with a resource identifier in the attribute management device in advance or an access control policy in a subsequent stage designated as an access control policy in a previous stage.

The first supply device supplies the generated access decision request and the acquired access control policy.

Upon receiving the supplied access decision request and access control policy, the access decision device acquires attribute information from the attribute management device by using the deny-type policy in the access control policy and decides the permission or the denial of the access based on this attribute information and the deny-type policy.

The second supply device supplies an access decision response generated to include a result of the decision and an obligation-type policy if the obligation-type policy is present in the access control policy used for this decision.

The third supply device supplies an obligation execution request including obligation information in an obligation-type policy when the result of decision in this access decision response is indicative of the permission and the obligation-type policy is present in the access decision response.

The obligation execution request device supplies an obligation action execution request including an obligation action in the obligation information to an obligation execution subject designated in the obligation information in the obligation execution request.

The access subject authentication device is access subject authentication device as the obligation execution subject which compares a value of an access subject identifier and access subject authentication information acquired from an access subject with a value of an access subject identifier and access subject authentication information that are previously set based on the obligation action execution request and authenticates that the access subject is valid when they coincide with each other.

The fourth supply device writes the value of the access subject identifier used for the authentication in the attribute management device and supplies an obligation execution result indicative of success of the obligation execution when they coincide with each other and the authentication is successful, and supplies an obligation execution result indicative of failure of the obligation execution when they do not coincide with each other and the authentication is unsuccessful.

The designation device designates an access control policy in a subsequent stage with respect to the policy acquisition device based on obligation information of the obligation-type policy in the access decision response when the obligation examination result is indicative of success.

The release device releases the suspension when a result of decision in the supplied access decision result is indicative of the permission and no obligation-type policy is present in the access decision response.

The cancellation device cancels the suspended resource access event when the result of decision in the supplied access decision response is indicative of the denial or when the obligation execution result is indicative of failure.

Although each embodiment will be described hereinafter with reference to the accompanying drawings, an outline of each embodiment will be first explained. The outline common to the respective embodiments concerns an access control apparatus which controls access to a resource that is formed of a document file or an operation execution unit as a control target. As shown in FIG. 3, FIG. 11, or FIG. 14 which will be described later, the access control apparatus comprises a memory that stores access control policies in first to $n-1^{th}$ stages (where n≥2) having a deny-type policy and an obligation-type policy and an access control policy in an $n^{th}$ stage having the deny-type policy and no obligation-type policy. It should be noted that the deny-type policy is a set of rules that "permit (or deny) an action of an access subject with respect to a resource". "Permit or deny" represents an effect with respect to an action request, and this effect may be an effect with respect to an effect for an arbitrary action request other than "permit or deny". The obligation-type policy is a set of rules that "executes obligation contents when conditions are met". A situation where the conditions are met is a situation where the deny-type policy represents permission in this example. The obligation contents are defined by a subject, a resource, an action, a complement, and others.

Upon receiving an access request for a resource, the access control apparatus executes the following step (i) to (iii), further repeatedly executes steps (ii) to (iii) when the number of stages exceeds 2, and executes step (iv) at the end.

(i) An access decision step in a first stage of deciding permission or denial of access based on a deny-type policy in a previously designated access control policy in a first stage, the deny-type policy being indicative of the permission or the denial of the access based on previously written attribute conditions and attribute information acquired from a previously written acquisition source in accordance with whether the attribute information meets the attribute conditions.

(ii) One or more policy acquisition steps of acquiring an access control policy in a subsequent stage designated in an obligation-type policy in the access control policy used for the decision when a result decided at the access decision step in each of first to n−1$^{th}$ stages is indicative of the permission.

(iii) An access decision step in each of second and subsequent stages of deciding the permission or the denial of access based on a deny-type policy in the acquired access control policy in each of the second and subsequent stages, the deny-type policy being indicative of the permission or the denial of the access based on previously written attribute conditions and attribute information acquired from a previously written acquisition source in accordance with whether the attribute information meets the attribute conditions.

(iv) A step of executing access to a resource when a result decided at an access decision step in a final stage in the access decision steps in the respective second and subsequent steps is indicative of the permission.

Figure 13:
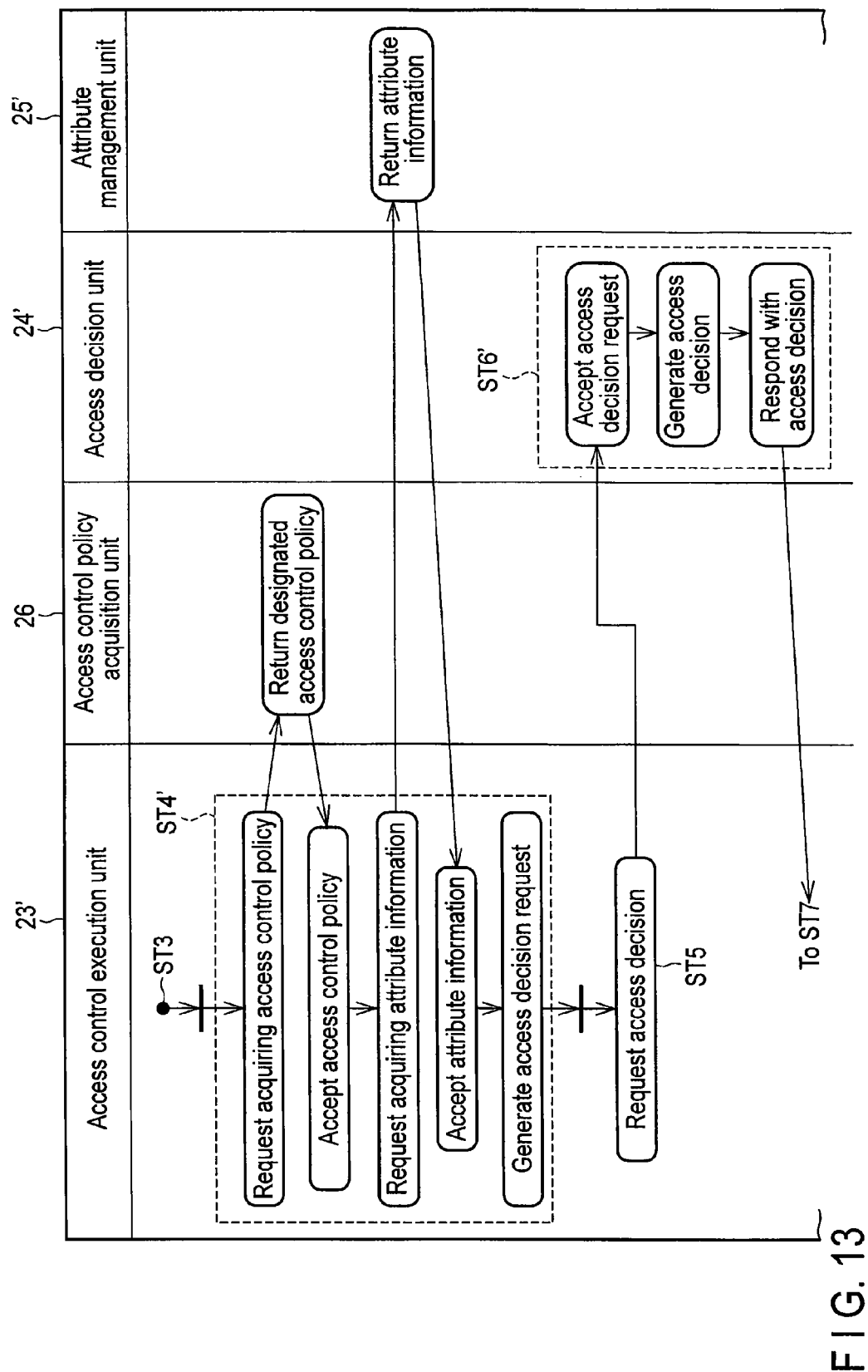
FIG. 13 is a schematic view for explaining an operation according to the second embodiment.

The above is the outline common to the respective embodiments. According to each embodiment having such an outline, the configuration that gradually executes the acquisition of the attribute information and the access decision can efficiently realize the detailed access control even if items of exclusive and selective attribute information are present. It should be noted that the term "access decision" may be referred to as policy evaluation. Here, as shown in FIG. 9 and FIG. 13 which will be described later, each of the first and second embodiments is an embodiment in which a timing for acquiring the attribute information and a functional unit are changed.

Furthermore, the access control apparatus according to an embodiment can be embodied with a hardware configuration or a configuration which is a combination of a hardware resource and software. As the software in the combination configuration, as shown in FIG. 1 and FIG. 12, there is used an access control program that is installed in a computer from a network or a non-transitory computer-readable storage medium M and executed by a processor in the computer to realize a function of the access control apparatus in the computer. This is likewise applied to an external device and others in a second embodiment.

Each embodiment will now be specifically described. It should be noted that, to simplify the explanation, a typical example where the number of stages n=2 will be described.

First Embodiment

FIG. 1 is a schematic view showing an access control apparatus and its peripheral configuration according to a first embodiment. A resource management apparatus 10 as an access target is connected to an access control apparatus 20. The access control apparatus 20 comprises an interface unit 21, a resource access unit 22, an access control execution unit 23, an access decision unit 24, an attribute management unit 25, an access control policy acquisition unit 26, an access control policy storage unit 27, an attribute update obligation execution unit 28, and an access subject authentication obligation execution unit 29.

Here, the resource management apparatus 10 is an apparatus that manages a resource formed of a document file or an operation execution unit as a control target, and it corresponds to a storage apparatus that stores the document file when the resource is the document file or corresponds to an operation execution apparatus including the operation execution unit when the resource is the operation execution unit. Here, it is assumed that the resource is the document file. It should be noted that the operation execution unit is, for example, a functional unit that executes an operation of opening and closing a door in response to locking and unlocking the door, and the door itself may be an automatic door or a manual door.

The access control apparatus 20 is a terminal apparatus operated by an access subject. Here, the access subject is assumed to be a general operator. However, the access subject is not restricted thereto, and it may be a telegraphic message input from a CPU that executes an application program in the access control apparatus 20 or from an external apparatus. In other words, the access subject is an operator, a functional unit, or an external apparatus that tries accessing the resource through the access control apparatus 20. Here, the access means an operation such as generation of the resource, viewing, update, deletion, or copy.

The interface unit 21 is an input/output interface between the access subject and the inside of the access control apparatus 20, and it has a function of accepting an access request which is input through an operation of an input unit (not shown) by the access subject and includes a value of a resource identifier indicative of a resource and a value of an action identifier indicative of access request contents with respect to the resource and a function of outputting an access result received from the resource access unit 22. Preferably, there is a graphical user interface (GUI) or a command-line user interface (CUI), but the present invention is not restricted thereto, and an arbitrary interface conformation can be used. Further, the interface unit 21 has functions of previously writing information, i.e., a function of writing attribute information to the attribute management unit 25, a function of writing an access control policy to the access control policy storage unit 27, and a function of writing access subject authentication information to a storage unit (not shown) in response to an operation of an input unit (not shown) by an access subject.

The resource access unit 22 is a functional unit configured to access a resource based on an access request accepted by the interface unit 21, and it has a function of starting a resource access event for accessing a resource based on the access request and a function of accessing the access the resource based on the access request if the started resource access event is not suspended nor canceled. The resource access unit 22 executes access based on the access request during continuation of the resource access event released from the suspended state by the access control execution unit 23, outputs an access result to the interface unit 21 as an access response, and provides it to the access subject. For example, when the access request requests a viewing action ("Read") with respect to a resource and this request is permitted by the access control execution unit 23, viewing (drawing) of the source is provided to the access subject. Furthermore, the resource may be stored in the access control apparatus 20, or it may be stored in an external apparatus such as a database. The resource may be stored at any position as long as it can be accessed by the resource access unit 22.

The access control execution unit 23 is a functional unit configured to control access gained by the resource access unit 22. As methods for controlling access gained by the resource access unit 22, for example, the following two methods are available. The first one is a method of mediating access with respect to a resource from the resource access unit 22. The second one is a method of monitoring the resource access unit 22 and controlling access with respect to a resource when a resource access event is started. Here, an example of the second method will be explained.

As the example of the second method, specifically, when a specific event associated with access occurs, a conformation that the access control execution unit 23 operates in accordance with an event is available. Moreover, as the control, a conformation that access is permitted or denied and the access is terminated in case of the denial is available. Besides, when a resource is image data, specific processing such as image conversion may be added. In this embodiment, as a simple example of the control, control of permitting (Permit) or denying (Deny) access is used.

Here, such an access control execution unit 23 has functions (f23-1) to (f23-8), as described below.

(f23-1) A function of suspending a resource access event prior to access gained by the resource access unit 22 when the resource access event is started.

(f23-2) A decision request generation function of acquiring an access request from the resource access unit 22 and generating an access decision request including the access request during this suspension.

(f23-3) A policy acquisition function of acquiring from the access control policy acquisition unit 26 an access control policy in a first stage designated in association with a resource identifier in the attribute management unit 25 or an access control policy in a subsequent stage designated in an access control policy in a previous stage when the access decision request is generated. This policy acquisition function is realized by transmitting the policy acquisition request to the access control policy acquisition unit 26 and acquiring the access control policy from the access control policy acquisition unit 26.

(f23-4) A function of supplying the generated access decision request and the acquired access control policy to the access decision unit 24.

(f23-5) A function of supplying an obligation execution request including obligation information in an obligation-type policy to the attribute update obligation execution unit 28 when a result of decision in this access decision response is indicative of permission and the obligation-type policy is present in the access decision response.

(f23-6) A function of designating an access control policy in a subsequent stage for a policy acquisition function based on obligation information of an obligation-type policy in the access decision response when an obligation execution result supplied from the attribute update obligation execution unit 29 is indicative of success.

(f23-7) A function of releasing suspension of a resource access event when a result of decision in the access decision result supplied from the access decision unit 24 is indicative of permission and an obligation-type policy is not present in the access decision response.

(f23-8) A function of canceling the suspended resource access event when a result of decision in the access decision response supplied from the access decision unit 24 is indicative of denial or when an obligation execution result is indicative of failure.

In addition, it is generally desirable for the access control execution unit 23 to decide access decision as denial "Deny" when it receives obligation execution failure. However, the access control execution unit 23 may not deny the access decision when it receives the obligation execution failure for the first time, and the access control execution unit 23 may deny the access decision when the access decision is again executed for a predetermined number of times and then the obligation execution failure is received. Complementary information involved by such obligation execution may be explicitly included in the obligation information.

The access decision unit 24 is a functional unit configured to decide permission or denial of access (access decision), and it has functions (f24-1) to (f24-2), as described below.

(f24-1) A function of acquiring attribute information from the attribute management unit 25 by using a deny-type policy in an access control policy upon receiving an access decision request and the access control policy supplied from the access control execution unit 23 and deciding permission or denial of access based on this attribute information and the deny-type policy.

(f24-2) A function of supplying to the access control execution unit 23 an access decision response that is generated to include a result of the decision and also an obligation-type policy if the obligation-type policy is present in the access control policy used for this decision.

It should be noted that execution of the access decision requires an access decision request including an access request, an access control policy in which information of decision criteria required for deciding permission or denial of the access request is written, and attribute information which is information that complements the access control policy. Either the access decision unit 24 or the access control execution unit 23 can acquire the attribute information. The access decision unit 24 acquires the attribute information in the first embodiment, and the access control execution unit 23 acquires the attribute information in the second embodiment.

Like an example shown in FIG. 2, the access decision request can be represented as an XML document using a request (Request) expression according to the XACML V2.0 specification.

In this example, an attribute (Attribute) element value that is a sub-element of a resource (Resource) element is indicative of "resource0001" that is a value representing a resource identifier. The resource identifier is information that enables identifying a resource, may be expression of a simple character string, and may take an information format including a retrieval site such as a uniform resource identifier (URI). It should be noted that a value of the resource identifier must be comprehended by the access decision unit 24 and the resource management unit 10. In this example, this value is represented as a character string value so that it can be designated as a data type (DataType) attribute value of the resource element.

An attribute (Attribute) element value which is a sub-element of an action element is a value that presents an action (Action) identifier. The action identifier is information that enables identifying an access action with respect to a resource. In this example, the action identifier is represented as a character string value so that it can be designated as a data type (DataType) attribute value of the action element. A character string value "Read" representing the action identifier is indicative of a browsing action.

Such an access decision request may include arbitrary attribute information such as a request time or a connection environment as long as it is attribute information that can be acquired by the access request apparatus besides the resource identifier and the action identifier. It should be noted that, in the example of this embodiment, the access decision request does not include attribute information concerning an access subject and an environment (an empty element). That is because attribute information concerning the access subject is acquired and updated by later-described attribute information update.

Like an example shown in FIG. 3, the access control policy is divided into stages and written to gradually execute access control.

Figure 5:
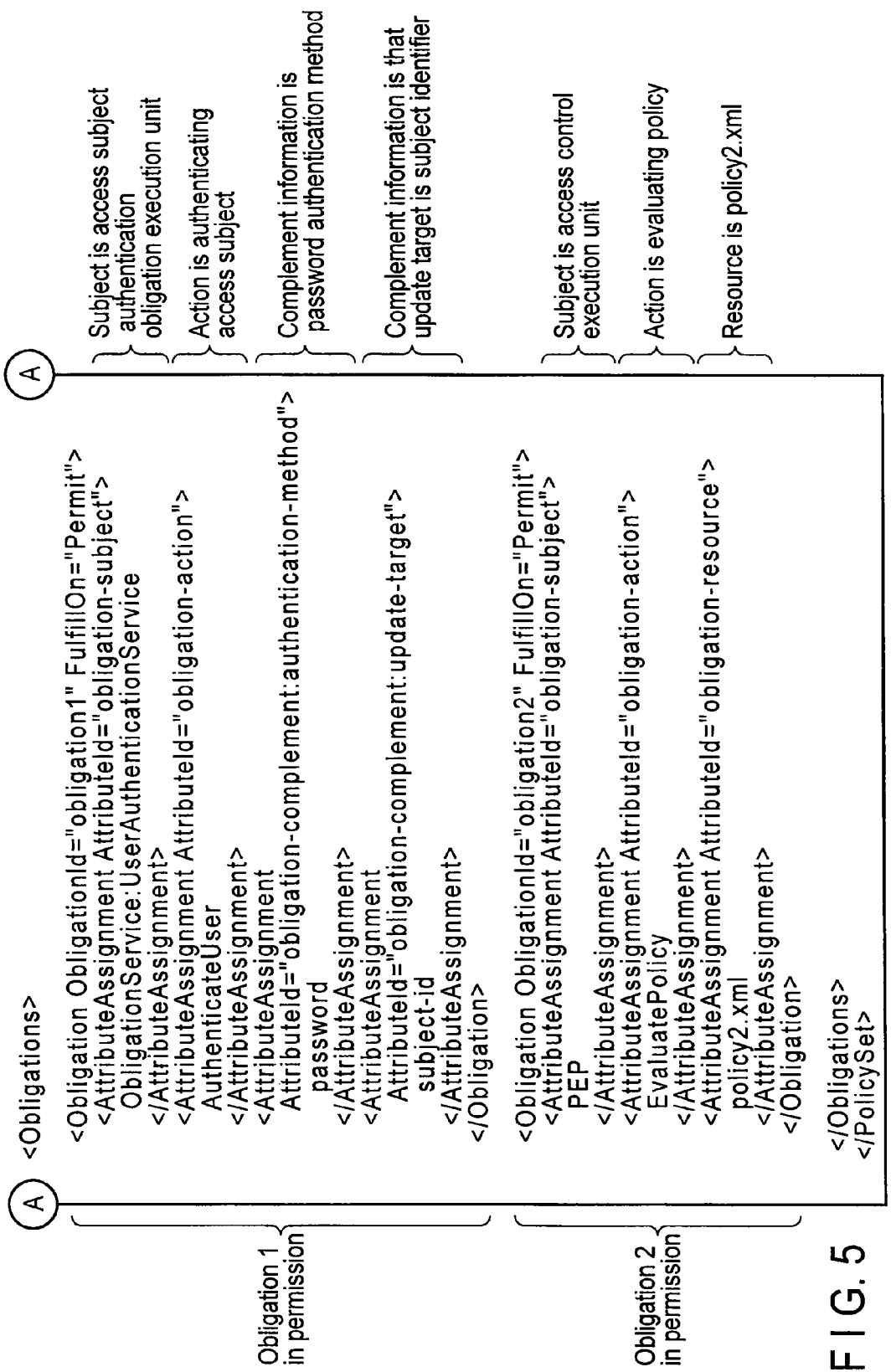
FIG. 5 is a schematic view showing the structural example of the access control policy in the initial stage according to the first embodiment.

As shown in FIG. 4 and FIG. 5, the access control policy can specifically take, for example, a policy format having a configuration that access control rules are gathered. Here, as a standard policy descriptive language, a descriptive format according to the XACML V2.0 specification defined in Non-patent Literature 1 is adopted.

This access control policy has one or more policy (Policy) elements. It may have a policy set (PolicySet) as information for integrating policy elements. The policy set (PolicySet) elements may be included in a policy set (PolicySet) element. The policy element has a rule (Rule) element, and fundamental contents of the access control are written in the rule element.

In general, a policy file is indicative of the fundamental contents of the access control, and it includes constituent elements such as "subject", "action", "resource", and "environment".

Specifically, "subject" is a subject of access execution, and it is represented by a subject (Subjects) element. "resource" is an object of access execution, and it is represented by a resource (Resources) element. "action" is action contents of access execution, and it is indicated by an action (Actions) element. "environment" is indicative of an environment of access execution. As an obligation (Obligation) element, an obligation involved by access decision is written. The obligation (Obligations) element is an element used for integrating obligation (Obligation) elements. It should be noted that information such as a name space or a data type is an arbitrary additional item, and hence it is omitted.

In the example shown in FIG. 4 and FIG. 5, two rules are set. One is a rule (Rule) element (which will be referred to as Rule 1 hereinafter) having a rule identifier (RuleId) attribute value "rule1". The other one is a rule (Rule) element (which will be referred to as a denial rule hereinafter) having a rule identifier (RuleId) attribute value "deny-all-others".

Here, Rule 1 represents a rule that provides a permission effect when meeting specific conditions. Rule 1 shown in FIG. 4 represents a rule for presenting conditions of an expiration date. A detailed description of this representation format will be omitted since a function provided by XACML V2.0 is used. This Rule 1 is rule representation that permits an effect if a current time (an attribute indicated by an EnvironmentAttributeDesignator element) as an environment attribute is before a date represented as an expiration date. Here, although a value of the current time is acquired by the access decision unit 24, the present invention is not restricted thereto, and the value of the current time may be acquired by the access execution control unit 23 and included in the access decision request. This can be likewise applied to other attribute information, and it is possible to choose a method of explicitly acquiring an attribute from the attribute management unit 25 by the access control execution unit 23 or a method of explicitly designating a reference source by using, for example, an environment attribute designator (EnvironmentAttributeDesignator) element and acquiring an attribute in the access decision unit 24 like Rule 1.

In contrast, the denial rule represents a rule for providing a denial effect when a rule for permission having corresponding conditions is not present (when all other rules are denied). Specifically, the denial rule is a rule that denies an effect of a policy (Policy) element to which the rule belongs when a rule for permission having corresponding conditions is not present in the policy (Policy) element to which the rule belongs.

Further, in the example shown in FIG. 4 and FIG. 5, an obligation (Obligation) element having an obligation identifier (ObligationId) element value "obligation1" represents an obligation action for updating attribute information. In this embodiment, as an example of update of the attribute information, a description will be given as to an example where an access subject is authenticated, identity information (an access subject identifier) of the access subject is acquired, and this information is updated as the attribute information. Besides, time stamp information used for accurately testifying a current time or physical or network positional information indicative of where the access control apparatus 20 is arranged can be used as information that should be acquired and updated. When such information is used, like the authentication of the access subject, the time stamp information or the positional information may be acquired and authenticated, and the attribute information may be updated. Furthermore, since an execution opportunity (FulfillOn) attribute value of an obligation element represents "Permit" (permission), when an effect (Effect) of the entire policy set (PolicySet) in FIG. 4 and FIG. 5 represents "permit" (permission), this obligation element is adapted.

In the XACML V2.0 specification, the obligation element is formed of attribute assignment (AttributeAssignment) elements. An attribute assignment (AttributeAssignment) element having an attribute identification (AttributeId) attribute value "obligation-subject" (an obligation subject) is indicative of an obligation execution subject that executes an obligation. In the example shown in FIG. 4 and FIG. 5, a value of this attribute assignment element is "ObligationService: UserAuthenticationService" (an obligation service: a user authentication service), and it is indicative of the access subject authentication obligation execution unit 29. The attribute assignment element having the attribute identifier attribute value "obligation-action" (an obligation action) represents an obligation action that should be executed by the obligation subject. In the example shown in FIG. 4 and FIG. 5, a value of this attribute assignment element is "AuthenticateUser" (authenticate a user), and it represents authenticating an access subject. The attribute assignment element having an attribute identifier attribute value "obligation-complement: authentication-method" (an obligation complement: an authentication method) is indicative of an authentication method as complement information involved by the obligation execution. In the example shown in FIG. 4 and FIG. 5, a value of the attribute assignment element is "password" (a password), and it is indicative of a password authentication method. Moreover, the attribute assignment element having an attribute identifier attribute value "obligation-complement: update-target" (an obligation complement: an update target) represents a target attribute which should be subjected to attribute update as complement information involved by the obligation execution. This example shows that an access subject identifier (subject-id) acquired by the authentication is updated. Information written in this obligation element is adapted when the access decision is "Permit" (permission), and it is supplied to the access control execution unit 23 as obligation information which is a part of an access decision response.

In this embodiment, to gradually advance to the next access control processing, like the example shown in FIG. 4 and FIG. 5, an obligation element having an obligation identifier element value "obligation2" (an obligation 2) is explicitly prepared. However, the access control execution unit 23 may implicitly decide and advance to the next access control processing without explicitly designating an obligation element. For example, it can be considered that the access control policy acquisition unit 26 acquires access control policies associated with the gradual access control processing in order.

Figure 6:
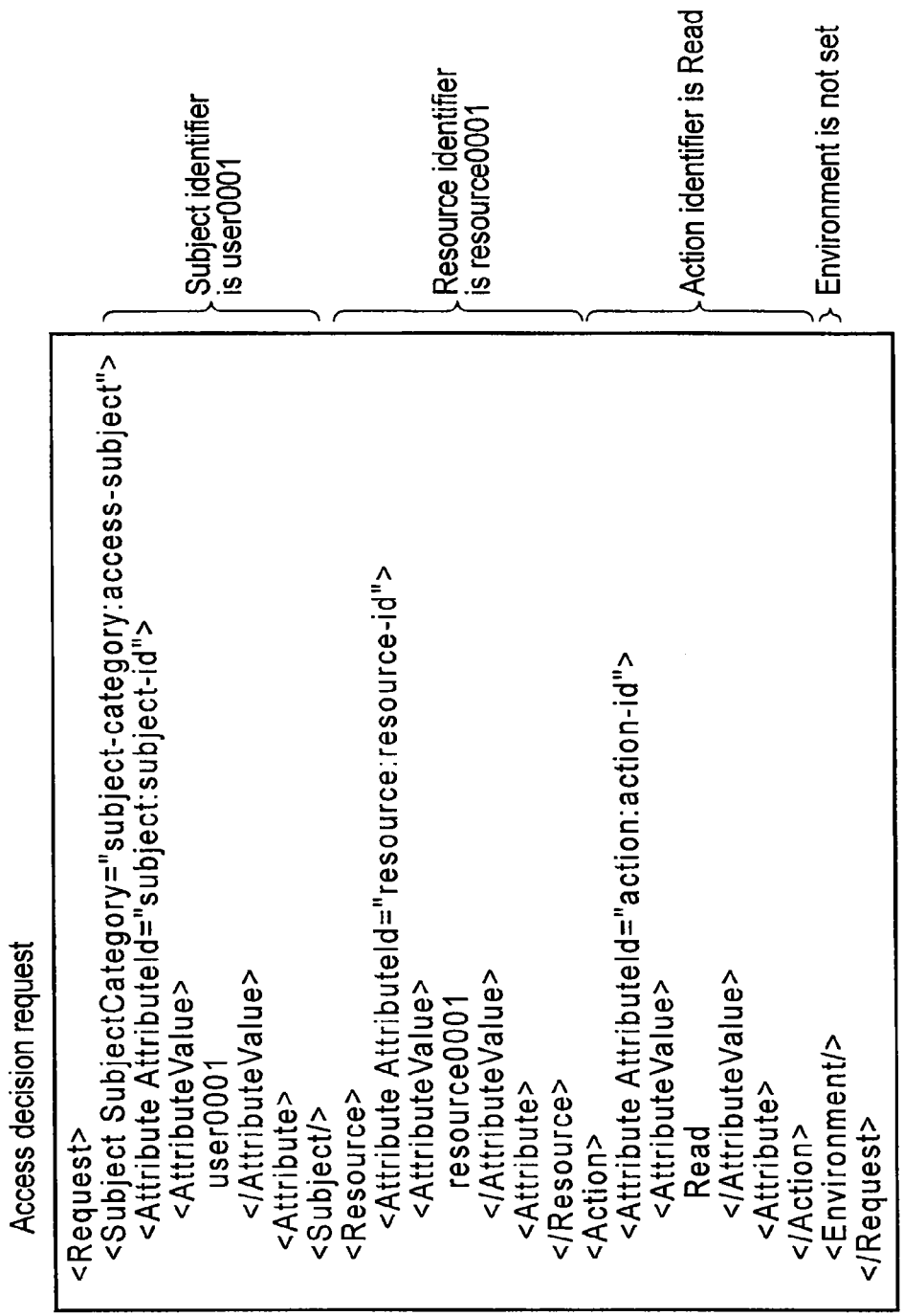
FIG. 6 is a schematic view showing a modification of an access decision request according to the first embodiment.
Figure 7:
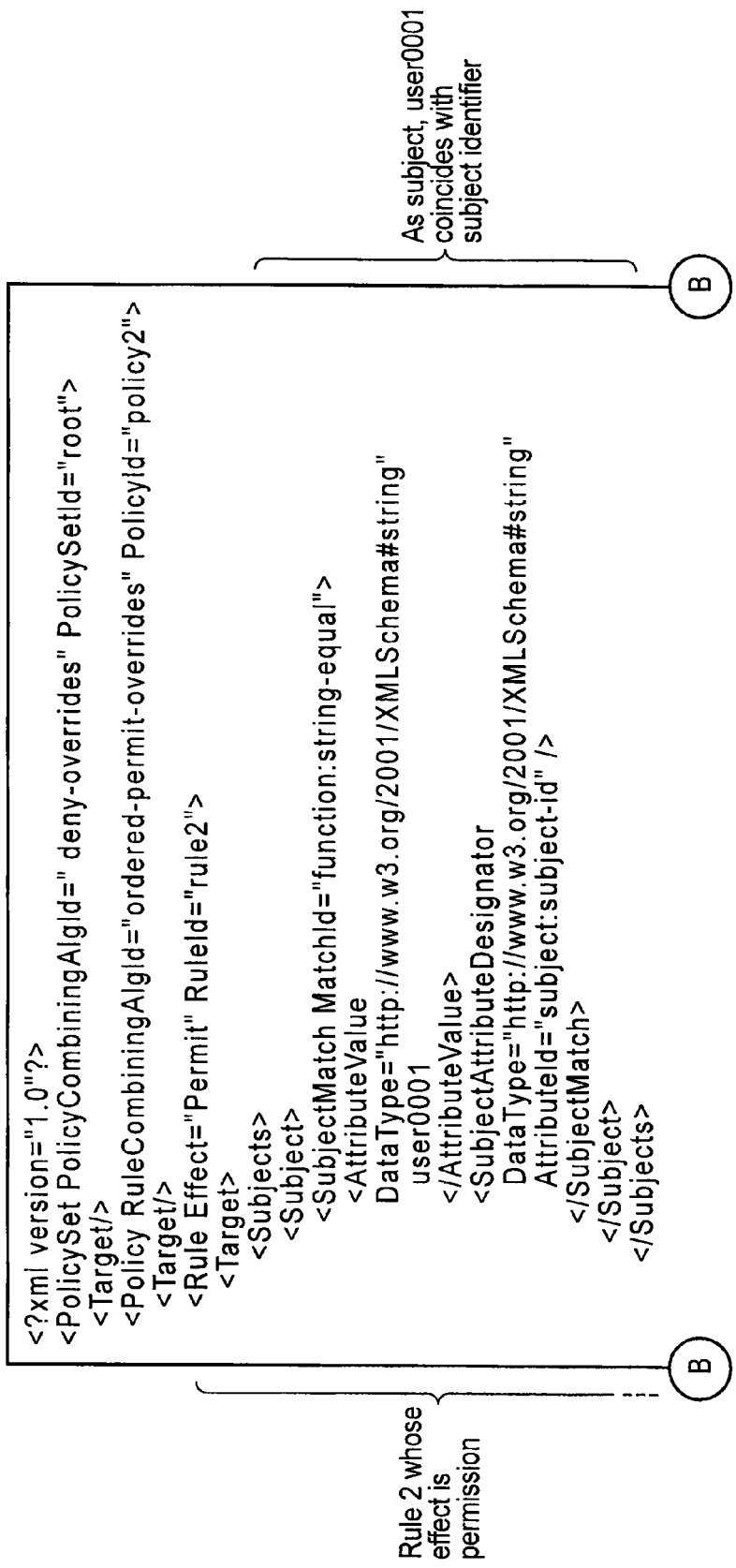
FIG. 7 is a schematic view showing a structural example of an access control policy in a final stage according to the first embodiment.

It should be noted that, as the access decision request, since the access decision unit 24 likewise acquires the attribute information from the attribute management unit 25 in the second stage in this embodiment, the access decision request shown in FIG. 2 is used. However, in place of the access decision request depicted in FIG. 2, an access decision request shown in FIG. 6 may be used. An example shown in FIG. 6 is a modification of the access decision request in the second stage produced by the obligation element having the obligation identifier element value "obligation2", and it is different from the access decision request in the first stage in that a subject (Subject) element indicative of the access subject is added. That is, the access decision request shown in FIG. 6 explicitly includes attribute information updated by an obligation executed by the obligation element having the obligation identifier element value "obligation1" (the obligation 1). In regard to this access decision request, as shown in FIG. 7 and FIG. 8, an attribute identifier attribute value having a subject attribute designator (SubjectAttributeDesignator) element indicative of an adaptation target of the access subject in the access control policy in the second stage can be set to make reference to an attribute (Attribute) element of a subject (Subject) element indicative of an access subject identifier in the access decision request. However, in this embodiment, to enable the access decision unit 24 to acquire attribute information from the attribute management unit 25, an attribute identifier attribute value (not shown) of a subject attribute designator element indicative of a reference source of the adaptation target of the access subject in the access control policy is written. Therefore, the same access decision request as that depicted in FIG. 2 is used. As described above, in regard to other arbitrary attributes, the configuration where updated attribute information is acquired from the attribute management unit 25 can be modified to the configuration where the updated attribute information can be acquired from the access decision request. It should be noted that the configuration where the updated attribute information is acquired from the access decision request will be described in the second embodiment.

Additionally, FIG. 7 and FIG. 8 show an example of the access control policy in the second stage. A rule (which will be referred to as Rule 2 hereinafter) indicated by a rule (Rule) element having a rule identifier (RuleId) attribute value "rule2" (Rule 2) is a rule representing an action that enables an access subject to be permitted with respect to a resource, and it is represented by using an access subject identifier "user0001" indicative of the access subject, a resource identifier "resource0001" indicative of the resource, and an action identifier "Read" indicative of the action. Incidentally, in case of the access decision request shown in FIG. 6, it can be understood that Rule 2 is adapted and the access decision is "Permit" (permission).

The attribute management unit 25 is a functional unit configured to manage attribute information, and it has a storage unit configured to update and store items of attribute information each including at least a value of a current date and a value of an access subject identifier. It should be noted that, in the attribute information in the attribute management unit 25, for example, static attribute information such as a name of the access control apparatus is written and managed in the attribute management unit 25 through the interface unit 21 in advance in terms of efficiency.

The access control policy acquisition unit 26 has a function of reading an access control policy requested to be acquired by the access control execution unit 23 from the access control policy storage unit 27 and a function of supplying the read access control policy to the access control execution unit 23.

The access control policy storage unit 27 is a storage unit that can be accessed by functional units, for example, the interface unit 21, the access control policy acquisition unit 26, and others, and it has functions (f27-1) to (f27-2), as described below.

(f27-1) A first policy storage function of storing one or more access control policies each including: a deny-type policy which represents permission when attribute conditions and an acquisition source of any attribute information are written in advance and the attribute information acquired from the attribute management unit 25 as the acquisition source meets the attribute conditions and represents denial when the permission is not represented; and an obligation-type policy which is used when the permission type is represented and in which obligation information including an obligation execution subject, an obligation action, and an access control policy in a subsequent stage is written. An example of such an access control policy including the deny-type policy and the obligation-type policy is as shown in FIG. 4 and FIG. 5.

(f27-2) A second policy storage function of storing an access control policy which is designated in any attribute information and includes a deny-type policy but does not include an obligation-type policy, the deny-type policy having attribute conditions previously including a value of a resource identifier, a value of an action identifier, and a value of an access subject identifier, a resource identifier and an action identifier read from an access decision request and an access subject identifier read from the attribute management unit 25 written therein, representing permission when the read value of the resource identifier, the read value of the action identifier, and the read value of the access subject identifier coincide with the attribute conditions, and representing denial when the permission is not represented. An example of such an access control policy which includes the deny-type policy but does not include the obligation-type policy is as shown in FIG. 7 and FIG. 8.

It should be noted that the access control policy may be written to the access control policy storage unit 27 from a non-illustrated decoding unit. Specifically, when a document file including a coded access control policy is a resource, an access control policy obtained by decoding the coded access control policy in the document file by the decoding unit may be written to the access control policy storage unit 27. Here, a key used for each of coding and decoding may be a common key, or a pair of a public key (for coding) and a private key (for decoding) of the access control apparatus 20 may be used.

The attribute update obligation execution unit 28 is a functional unit configured to execute a corresponding obligation in accordance with an obligation execution request from the access control execution unit 23 and update attribute information managed by the attribute management unit 25. Here, the attribute update obligation execution unit 28 has respective functions (f28-1) to (f28-2), as described below.

(f28-1) An obligation execution request function of supplying an obligation action execution request including an obligation action in obligation information with respect to an obligation execution subject designated in obligation information in an obligation execution request supplied from the access control execution unit 23. In the example shown in FIG. 5, the obligation execution subject of the obligation element having the obligation identifier element value "obligation1" (Obligation 1) is the access subject authentication obligation execution unit 29.

(f28-2) A function of writing a value of an access subject identifier used for authentication to the attribute management unit 25 and supplying an obligation execution result indicative of success of obligation execution to the access control execution unit 23 when both values coincide with each other and the authentication is successful in the access subject authentication obligation execution unit 29, or transmitting an obligation execution result indicative of failure of the obligation execution to the access control execution unit 23 when both the values do not coincide with each other and the authentication is unsuccessful. It should be noted that a value of the access subject identifier may be written to the attribute management unit 25 from the access subject authentication obligation execution unit 29. Likewise, the obligation execution result may be supplied from the access subject authentication obligation execution unit 29 to the access control execution unit 23.

Further, the attribute update obligation execution unit 28 may sequentially request the obligation execution units provided in accordance with each of obligation contents to execute obligations, and the obligation execution unit that can execute a corresponding obligation can execute the obligation after accepting the obligation execution request. Incidentally, in a case where the obligation execution units are provided, it is generally desirable to execute the obligations in the order written in the obligation information and return an obligation execution response indicative of obligation execution success to the access control execution unit 23 only when execution of all the obligations is successful. Furthermore, the obligation execution unit is not restricted to the inside of the access control apparatus 20, and it may be provided to another apparatus.

As a specific example of the obligation execution unit which is requested to execute an obligation by the attribute update obligation execution unit 28, there is the access subject authentication obligation execution unit 29.

The access subject authentication obligation execution unit 29 is a functional unit which is configured to authenticate an access subject and acquire identity information of the access subject, and it has an access subject authentication function as an obligation execution subject that compares a value of an access subject identifier and access subject authentication information acquired from the access subject with a value of an access subject identifier and access subject authentication information which are previously set and authenticates validity of the access subject when they coincide with each other. It should be noted that the access subject authentication information may be called credential information (access subject certification information), and a password of the access subject is used here. Although the access subject authentication information is stored in the storage unit (not shown) in the access control apparatus 20 in association with the access subject identifier, the present invention is not restricted thereto, and this information may be stored in an external storage apparatus. It should be noted that the obligation information for attribute update designates a password authentication method in the example shown in FIG. 5, and hence the access subject authentication information is a password. Based on this designation, the access subject authentication obligation execution unit 29 presents callback information such as an input form for authentication to the access subject through the interface unit 21, acquires an access subject identifier and the password from the returned input form after inputting the access subject identifier and the password by the access subject, and executes access subject authentication.

Figure 10:
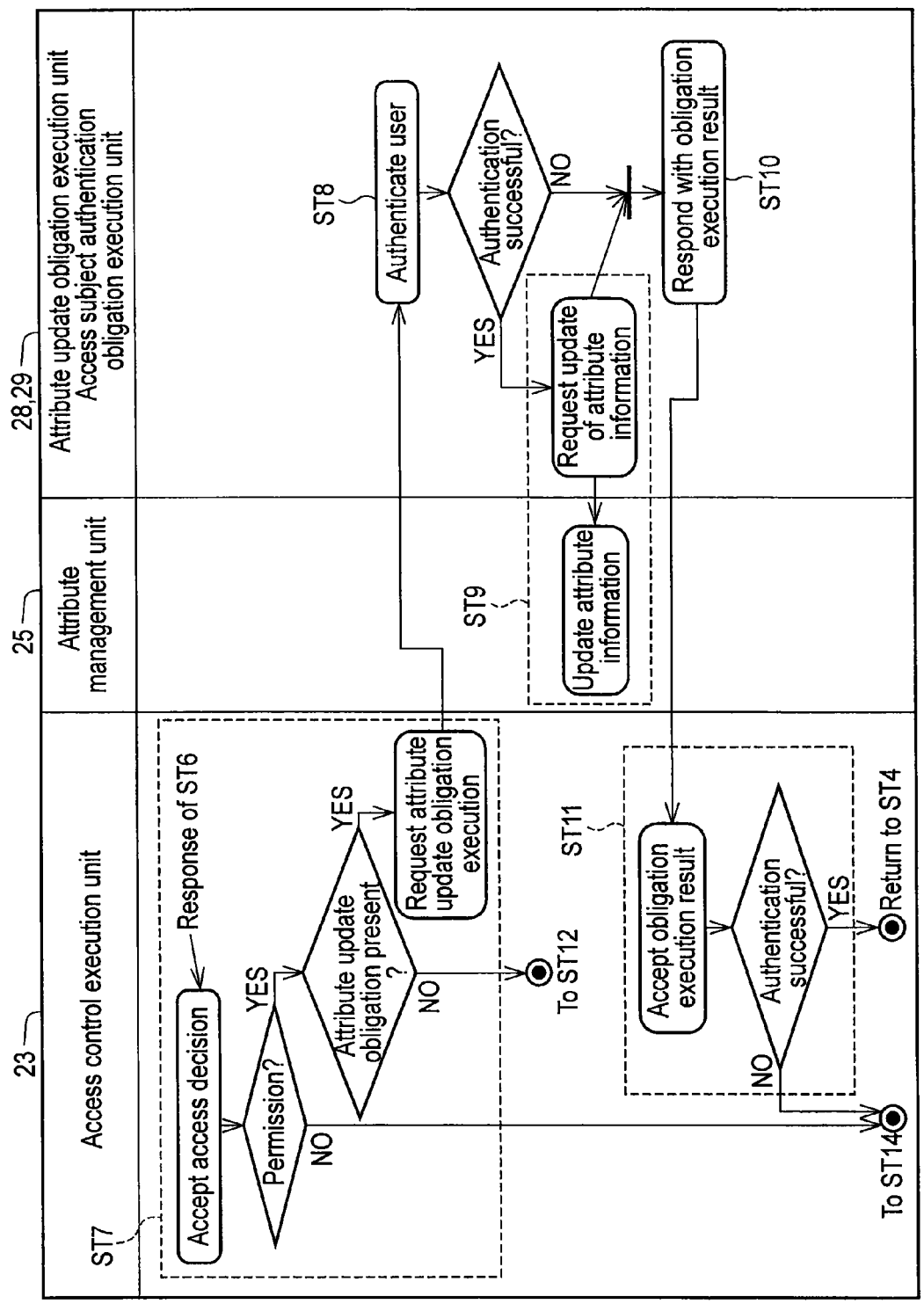
FIG. 10 is a schematic view for explaining the operation according to the first embodiment.

An operation of the thus configured access control apparatus 20 will now be described with reference to FIG. 9 and FIG. 10.

(ST1) In the access control apparatus 20, with a an operation of a non-illustrated input unit by the access subject, an access request including a resource identifier indicative of a resource and an action identifier indicative of access request contents for the resource is input to the interface unit 21. The interface unit 21 accepts this access request.

(ST2) Based on the accepted access request, the resource access unit 22 starts a resource access event for accessing the resource. It should be noted that, if the started resource access event is not suspended or canceled, the resource access unit 22 accesses the resource in the resource management apparatus 10 based on the access request.

(ST3) In contrast, when the resource access event is started, the access control execution unit 23 suspends the resource access event prior to access gained by the resource access unit 22.

(ST4) The access control execution unit 23 acquires the access request from the resource access unit 22 during this suspension and generates an access decision request including the access request. Further, when the access request is generated, the access control execution unit 23 acquires from the access control policy acquisition unit 26 an access control policy in a first stage designated in association with a resource identifier in the attribute management unit 25 in advance. The access control policy in the first stage (a first time) is not restricted to a situation where it is designated in association with the resource identifier in advance, and it may be designated irrespective of the resource identifier in advance.

(ST5) The access control execution unit 23 supplies the generated access decision request and the acquired access control policy to the access decision unit 24.

(ST6) Upon receiving the supplied access decision request and access control policy (as complement information used for deciding access), the access decision unit 24 acquires attribute information from the attribute management unit 25 by using a deny-type policy in the access control policy and decides permission or denial of access based on this attribute information and the deny-type policy. In this example, since a value of a current date acquired from the attribute management unit 25 meets attribute conditions of an expiration date, the access decision unit 24 decides the permission of access. The access decision unit 24 supplies to the access control execution unit 23 an access decision response generated to include a result of this decision and further include an obligation-type policy if the obligation-type policy is present in the access control policy used for this decision.

(ST7) In a case where the result of the decision in this access decision response is indicative of permission, the access control execution unit 23 supplies to the attribute update obligation execution unit 28 an obligation execution request including attribute information in an obligation-type policy if the obligation-type policy is present in the access decision response. It should be noted that, if the obligation-type policy is not present in the access decision response, the control advances to step ST12. Furthermore, if the result of the decision in the access decision response is indicative of "Deny", the control can advance to step ST14.

(ST8) The attribute update obligation execution unit 28 supplies an obligation action execution request including an obligation action in obligation information to an obligation execution subject designated in the obligation information in this obligation execution request. In this example, the obligation execution subject designated in the obligation information corresponds to the access subject authentication obligation execution unit 29. The access subject authentication obligation execution unit 29 authenticates the access subject through the interface unit 21. Specifically, based on this obligation action execution request, the access subject authentication obligation execution unit 29 compares a value of an access identifier and access subject authentication information acquired from the access subject with a value of an access subject identifier and access subject authentication information that are previously set and authenticates validity of the access subject when they coincide with each other.

(ST9) When both the values coincide with each other and the authentication is successful, the access subject authentication obligation execution unit 29 writes the access subject identifier used for the authentication to the attribute management unit 25. It should be noted that the value is updated when attribute information (the access subject identifier in this example) corresponding to the attribute management unit 25 is present or the attribute and the value are newly registered when the corresponding attribute information is not present.

(ST10) The attribute update obligation execution unit 28 returns a result of the obligation execution irrespective of success or failure of the obligation execution. Specifically, when both the values compared in step ST8 coincide with each other and the authentication is successful, the attribute update obligation execution unit 28 performs writing in step ST9 and supplies an obligation execution result indicative of success of the obligation execution to the access control execution unit 23. Moreover, when both the values compared in step ST8 do not coincide with each other and the authentication is unsuccessful, the attribute update obligation execution unit 28 supplies an obligation execution result indicative of failure of the obligation execution to the access control execution unit 23.

(ST11) When this obligation execution result is indicative of success, the access control execution unit 23 designates an access control policy in a subsequent stage based on the obligation information of the obligation-type policy in the access decision result of step ST7. This designation is based on the obligation element having the obligation element value "obligation2" (Obligation 2) in the example shown in FIG. 4 and FIG. 5. The access decision is continued based on the obligation execution result indicative of success and the designated access control policy in the subsequent stage. When the access decision is continued, step ST4 to step ST11 are repeatedly executed. It should be noted that, when the access decision is not continued since the obligation execution result is indicative of failure, the control advances to step ST14.

Operations of steps ST4 to ST11 which are repeatedly executed when the access decision is continued will now be described. However, in this example, the access control policy in the subsequent stage is an access control policy in a final stage and the control advances to step ST12 from step ST7, the operations of steps ST8 to ST11 are not carried out.

(ST4) The access control execution unit 23 acquires an access request from the resource access unit 22 during the suspension of the resource access event and generates an access decision request including the access request. This access decision request may be equal to that described above, or it may include the attribute information updated in step ST9. In this example, the access decision request is equal to the above-described access decision request. Moreover, when the access request is generated, the access control execution unit 23 acquires the access control policy in the subsequent stage designated in step ST11 from the access control policy acquisition unit 26.

(ST5) The access control execution unit 23 supplies the generated access decision request and the acquired access control policy to the access decision unit 24.

(ST6) Upon receiving the supplied access decision request and access control policy, the access decision unit 24 acquires attribute information from the attribute management unit 25 by using a deny-type policy in the access control policy and decides permission or denial of access based on this attribute information and the deny-type policy. In this example, the access decision unit 24 acquires a value of an access subject identifier from the attribute management unit 25, a resource identifier and an action identifier read from the access decision request and the acquired access subject identifier coincide with a value of a resource identifier, a value of an action identifier, and a value of an access subject identifier previously written as attribute conditions in the deny-type policy, and hence permission of access is decided. The access decision unit 24 supplies to the access control execution unit 23 an access decision response generated to include a result of this decision and further include an obligation-type policy if the obligation-type policy is present in the access control policy used for this decision. In this example, the access decision response which includes the result of the decision indicative of permission of access but does not include the obligation-type policy is supplied.

(ST7) When a result of the decision in the supplied access decision response is indicative of "Permit (permission)", the access control execution unit 23 advances to step ST12 if an obligation-type policy is not present in the access decision response.

(ST12) The access control execution unit 23 releases suspension of a resource access event in the resource access unit 22.

(ST13) When the suspension of the resource access event is released, the resource access unit 22 accesses a resource through the interface unit 21 and outputs an access result to the access subject. In this example, based on a value "resource0001" of the resource identifier and a value "Read" of the action identifier in the access request, a document file in the resource management apparatus 10 is read and output to be displayed. It should be noted that, when the resource is the operation execution unit in place of the document file, the unit outputs an access result indicating that the operation execution unit (for example, a door opening/closing unit) represented by the value of the resource identifier has executed an operation represented by the value (for example, door opening) of the action identifier.

(ST14) Further, when the result of the decision in the access decision response supplied in step ST6 is indicative of "Deny" or when the obligation execution result supplied in step ST10 is indicative of failure, the access control execution unit 23 cancels the suspended resource access event. When the resource access event is canceled, the resource access unit 22 outputs information indicative of denial of access to the access subject through the interface unit 21.

As described above, according to this embodiment, the resource access event started in response to the access request for the resource is suspended, the access control policies in stages are sequentially used, acquisition of the attribute information and access decision based on the acquired attribute information are sequentially executed in accordance with each of the access control policies, and the suspension of the resource access event is released to access the resource when all access decision results represent permission.

As a result, even if items of exclusive and selective attribute information are present, acquisition of the attribute information and the access decision based on the acquired attribute information are sequentially carried out in accordance with each of the access control policies, whereby the detailed access control can be efficiently realized.

Furthermore, when the step of updating the attribute information required for the access decision in the next stage based on the obligation execution after the access decision and the step of acquiring the updated attribute information and performing the access decision are executed in a linkage pattern, the detailed access control can be efficiently realized.

It should be noted that the example where the number of stages n=2 has been described in this embodiment, but the present invention is not restricted thereto, and the embodiment can be carried out in the same manner and the same effect can be obtained even though the number of stages n is an arbitrary plural number.

Second Embodiment

FIG. 12 is a schematic view showing an access control apparatus and its peripheral configuration according to the second embodiment, FIG. 13 is a schematic view for explaining an operation in this embodiment, like reference numbers denote parts equal to those in the above-described drawings to omit a detailed description thereof, and different parts alone will be mainly explained herein.

That is, the second embodiment is a modification of the first embodiment, and the step of acquiring the attribute information and the functional unit are changed. That is, in the access control apparatus 20 according to the first embodiment, the access control execution unit 23 does not acquire the attribute information from the attribute management unit 254 in step ST4, but the access decision unit 24 acquires the attribute information from the attribute management unit 25 in step ST6.

In contrast, in an access control apparatus 20' according to the second embodiment, an access control execution unit 23' acquires attribute information from an attribute management unit 25' in step ST4' and, conversely, an access decision unit 24' does not acquire the attribute information from the attribute management unit 25' in step ST6'.

Specifically, the access control execution unit 23' has functions (f23-c1) to (f23-c4), as described below, in place of functions (f23-2) to (f23-4) in functions (f23-1) to (f23-8).

(f23-c1) A function of acquiring an access request from a resource access unit 22 during suspension of a resource access event.

(f23-c2) A policy acquisition function of acquiring an access control policy in an initial stage designated in association with a resource identifier in the attribute management unit 25' in advance or an access control policy in a subsequent stage designated in an access control policy in a previous stage when an access request is obtained.

(f23-c3) A function of acquiring attribute information from the attribute management unit 25' by using a deny-type policy in the acquired access control policy and generating an access decision request including this attribute information and an access request.

(f23-c4) A function of supplying the generated access decision request and the acquired access control policy to the access decision unit 24'.

It should be noted that the access decision unit 24 in functions (f23-7) and (f23-8) is substituted by the access decision unit 24'.

The access decision unit 24' has function (f24-c1), as described below, in place of function (f24-1) in functions (f24-1) to (24-2), as described above.

(f24-c1) A function of deciding permission or denial of access based on attribute information in an access decision request and a deny-type policy in the access control policy upon receiving the access decision request and the access control policy supplied from the access control execution unit 23'.

It should be noted that the access control execution unit 23 in function (f24-1) is substituted by the access control execution unit 23'. As described above, in the second embodiment, substituting reference numbers 23 and 24 in the first embodiment by reference numbers 23' and 24' can be likewise applied to other functions.

An operation of the thus configured access control apparatus 20' will now be described with reference to FIG. 13. As the operation of the access control apparatus 20', the following steps ST4' and ST6' are executed in place of steps ST4 and ST6 in steps ST1 to ST14.

(ST4') The access control execution unit 23' acquires an access request from the resource access unit 22 during suspension of a resource access event. Further, the access control execution unit 23' acquires from an access control policy acquisition unit 26 an access control policy in an initial stage designated in association with a resource identifier in the attribute management unit 25 in advance. The access control policy in the initial stage (a first time) is not restricted to a situation where it is designated in association with the resource identifier in advance, and it may be designated irrespective of the resource identifier. Then, the access control execution unit 23' acquires the attribute information from the attribute management unit 25 by using a deny-type policy in the acquired access control policy. The access control execution unit 23' generates an access request and an access decision request including the attribute information.

(ST6') Upon receiving the access decision request and the access control policy supplied from the access control execution unit 23, the access decision unit 24' decides permission or denial of access based on the attribute information in the access decision request and the deny-type policy in the access control policy. The access decision unit 24' supplies to the access control execution unit 23' an access decision response that is generated to include a result of this decision and further include an obligation-type policy if the obligation-type policy is present in the access control policy used for this decision.

As described in conjunction with such steps ST4' and ST6', in the access decision unit 24', a function of acquiring attribute information from the attribute management unit 25 in the access control apparatus 20' is omitted as compared with the access decision unit 24 according to the first embodiment. Therefore, the access decision unit 24' can be configured as an independent external apparatus. It should be noted that the external apparatus may be called an access decision apparatus. A combination of the external apparatus and the access control apparatus 20' may be called an access control system.

As described above, according to this embodiment, in addition to the effect of the first embodiment, the access decision unit 24' can be arranged outside the access control apparatus 20'.

Moreover, likewise, the example where the number of stages n=2 has been explained in this embodiment, but the present invention is not restricted thereto, and the embodiment can be likewise carried out to obtain the same effect even though the number of stages n is an arbitrary plural number as shown in FIG. 14.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage medium which is a non-transitory computer-readable storage medium comprising: attribute management device; first policy storage device; and second policy storage device, and storing an access control program which is executed by a processor of an access control apparatus that controls access to a resource constituted of a document file or an operation execution unit as a control target, the access control program comprising:

first program code which allows the processor to execute processing of updating and writing items of attribute information each including at least a value of a current data item and a value of an access subject identifier to the attribute management device;

second program code which allows the processor to execute processing of writing one or more access control policies to the first policy storage device, each access controlling policy including: a deny-type policy which represents permission when attribute conditions and an acquisition source of any attribute information are written in advance and attribute information acquired from the attribute management device as the acquisition source meets the attribute conditions, and represents denial when the permission is not represented; and an obligation-type policy which is used when the permission is represented and in which obligation information including designation of an obligation execution subject, an obligation action, and an access control policy in subsequent stage is written;

third program code which allows the processor to execute processing of writing in the second policy storage device an access control policy which is designated in any obligation information, the access control policy including a deny-type policy in which attribute conditions including a value of a resource identifier, a value of an action identifier, and a value of an access subject identifier, a resource identifier and an action identifier read from an access decision request, and an access subject identifier read from the attribute management device are written in advance, and which represents permission when the read value of the resource identifier, the read value of the action identifier, and the read value of the access subject identifier coincide with the attribute conditions and represents denial when the permission is not represented, the access control policy including no obligation-type policy;

fourth program code which allows the processor to execute request acceptance processing of accepting an access request including a value of a resource identifier indicative of the resource and a value of an action identifier indicative of access request contents with respect to the resource;

fifth program code which allows the processor to execute access event start processing of starting a resource access event for accessing the resource based on the accepted access request;

sixth program code which allows the processor to execute resource access processing of accessing the resource based on the access request if the started resource access event is not suspended or canceled;

seventh program code which allows the processor to execute suspension processing of suspending the resource access event prior to access gained in the resource access processing when the resource access event is started;

eighth program code which allows the processor to execute decision request generation processing of acquiring an access request from the resource access processing and generating an access decision request including the access request;

ninth program code which allows the processor to execute policy acquisition processing of acquiring an access control policy in an initial stage designated in association with a resource identifier in the attribute management device in advance and an access control policy in a subsequent stage designated an access control policy in a previous stage when the access decision request is generated;

tenth program code which allows the processor to execute first supply processing of supplying the generated access decision request and the acquired access control policy;

eleventh program code which allows the processor to execute access decision processing of acquiring attribute information from the attribute management device by using a deny-type policy in the access control policy when the supplied access decision request and access control policy are received, and deciding permission or denial of the access based on the attribute information and the deny-type policy;

twelfth program code which allows the processor to execute second supply processing of supplying an access decision response generated to include a result of the decision and further include an obligation-type policy when the obligation-type policy is present in the access control policy used for this decision;

thirteenth program code which allows the processor to execute third supply processing of supplying an obligation execution request including obligation information in an obligation-type policy when a result of the decision in the access decision response represents permission and the obligation-type policy is present in the access decision response;

fourteenth program code which allows the processor to execute obligation execution request processing of supplying an obligation action execution request including an obligation action in obligation information to an obligation execution subject designated in the obligation information in the obligation execution request;

fifteenth program code which allows the processor to execute access subject authentication processing as the obligation execution subject of comparing a value of an access subject identifier and access subject authentication information acquired from an access subject with a value of an access subject identifier and access subject authentication information which are previously set based on the obligation action execution request, and authenticating that the access subject is valid when both the values and the information coincide with each other;

sixteenth program code which allows the processor to execute fourth supply processing of writing the value of the access subject identifier used for the authentication to the attribute management device and supplying an obligation execution result indicative of success of obligation execution when both the values and the information coincide with each other and the authentication is successful, and supplying an obligation execution result indicative of failure of the obligation execution when both the values and the information do not coincide with each other and the authentication is unsuccessful;

seventeenth program code which allows the processor to execute designation processing of designating an access control policy in a subsequent stage in the policy acquisition processing based on obligation information of the obligation-type policy in the access decision response when the obligation execution result is indicative of success;

eighteenth program code which allows the processor to execute release processing of releasing the suspension if no obligation-type policy is present in the access decision response in a situation where a result of the decision in the supplied access decision response represents permission; and nineteenth program code which allows the processor to execute cancel processing of canceling the suspended resource access event when a result of the decision in the supplied access decision response represents denial or when the obligation execution result represents failure.

2. A storage medium which is a non-transitory computer-readable storage medium comprising: attribute management device; first policy storage device; and second policy storage device, and storing an access control program which is executed by a processor of an access control apparatus that controls access to a resource constituted of a document file or an operation execution unit as a control target and is configured to communicate with an external apparatus, the access control program comprising:

first program code which allows the processor to execute processing of updating and writing items of attribute information each including at least a value of a current data item and a value of an access subject identifier to the attribute management device;

second program code which allows the processor to execute processing of writing one or more access control policies to the first policy storage device, each access controlling policy including: a deny-type policy which represents permission when attribute conditions and an acquisition source of any attribute information are written in advance and attribute information acquired from the attribute management device as the acquisition source meets the attribute conditions, and represents denial when the permission is not represented; and an obligation-type policy which is used when the permission is represented and in which obligation information including designation of an obligation execution subject, an obligation action, and an access control policy in subsequent stage is written;

third program code which allows the processor to execute processing of writing in the second policy storage device an access control policy which is designated in any obligation information, the access control policy including a deny-type policy in which attribute conditions including a value of a resource identifier, a value of an action identifier, and a value of an access subject identifier, a resource identifier and an action identifier read from an access decision request, and an access subject identifier read from the attribute management device are written in advance, and which represents permission when the read value of the resource identifier, the read value of the action identifier, and the read value of the access subject identifier coincide with the attribute conditions and represents denial when the permission is not represented, the access control policy including no obligation-type policy;

fourth program code which allows the processor to execute request acceptance processing of accepting an access request including a value of a resource identifier indicative of the resource and a value of an action identifier indicative of access request contents with respect to the resource;

fifth program code which allows the processor to execute access event start processing of starting a resource access event for accessing the resource based on the accepted access request;

sixth program code which allows the processor to execute resource access processing of accessing the resource based on the access request if the started resource access event is not suspended or canceled;

seventh program code which allows the processor to execute suspension processing of suspending the resource access event prior to access gained in the resource access processing when the resource access event is started;

eighth program code which allows the processor to execute processing of acquiring an access request from the resource access processing during the suspension of the resource access event;

ninth program code which allows the processor to execute policy acquisition processing of acquiring an access control policy in an initial stage designated in association with a resource identifier in the attribute management device in advance or an access control policy in a subsequent stage designated in an access control policy in a previous stage when the access request is acquired;

tenth program code which allows the processor to execute processing of acquiring attribute information from the attribute management device by using a deny-type policy in the acquired access control policy and generating an access decision request including the attribute information and the access request;

eleventh program code which allows the processor to execute first supply processing of supplying the generated access decision request and the acquired access control policy to the external apparatus;

twelfth program code which allows the processor to execute third supply processing of supplying an obligation execution request including obligation information in an obligation-type policy if a result of decision in an access decision response received from the external apparatus represents permission and the obligation-type policy is present in the access decision response in a situation where, upon receiving the access decision request and the access control policy, the external apparatus executes access decision processing of deciding permission or denial of the access based on the attribute information in the access decision request and the deny-type policy in the access control policy and second supply processing of supplying to the access control apparatus the access decision response generated to include a result of the decision and further include the obligation-type policy if the obligation-type policy is present in the access control policy used for the decision;

thirteenth program code which allows the processor to execute obligation execution request processing of supplying an obligation action execution request including an obligation action in the obligation information with respect to an obligation execution subject designated in the obligation information in the obligation execution request;

fourteenth program code which allows the processor to execute access subject authentication processing as the obligation execution subject of comparing a value of an access subject identifier and access subject authentication information acquired from an access subject with a value of an access subject identifier and access subject authentication information which are previously set based on the obligation action execution request, and authenticating that the access subject is valid when both the values and the information coincide with each other;

fifteenth program code which allows the processor to execute fourth supply processing of writing the value of the access subject identifier used for the authentication to the attribute management device and supplying an obligation execution result representing success of the obligation execution when both the values and the information coincide with each other and the authentication is successful, or supplying an obligation execution result representing failure of the obligation execution when both the values and the information do not coincide with each other and the authentication is unsuccessful;

sixteenth program code which allows the processor to execute designation processing of designating an access control policy in a subsequent stage in the policy acquisition processing based on the obligation information of the obligation-type policy in the access decision response when the obligation execution result represents success;

seventeenth program code which allows the process to execute release processing of releasing the suspension when a result of the decision in the supplied access decision response represents permission and the obligation-type policy is not present in the access decision response; and eighteenth program code which allows the processor to execute cancel processing of canceling the suspended resource access event when a result of the decision in the supplied access decision response represents denial or when the obligation execution result represents failure.

3. An access control apparatus which controls access to a resource constituted of a document file or an operation execution unit as a control target, comprising:

an attribute management device configured to update and store items of attribute information each including at least a value of a current data item and a value of an access subject identifier;

a first policy storage device configured to store one or more access control policies, each access controlling policy including: a deny-type policy which represents permission when attribute conditions and an acquisition source of any attribute information are written in advance and attribute information acquired from the attribute management device as the acquisition source meets the attribute conditions, and represents denial when the permission is not represented; and an obligation-type policy which is used when the permission is represented and in which obligation information including designation of an obligation execution subject, an obligation action, and an access control policy in subsequent stage is written;

a second policy storage device configured to store an access control policy which is designated in any obligation information, the access control policy including a deny-type policy in which attribute conditions including a value of a resource identifier, a value of an action identifier, and a value of an access subject identifier, a resource identifier and an action identifier read from an access decision request, and an access subject identifier read from the attribute management device are written in advance, and which represents permission when the read value of the resource identifier, the read value of the action identifier, and the read value of the access subject identifier coincide with the attribute conditions and represents denial when the permission is not represented, the access control policy including no obligation-type policy;

a request acceptance device configured to accept an access request including a value of a resource identifier indicative of the resource and a value of an action identifier indicative of access request contents with respect to the resource;

an access event starting device configured to start a resource access event for accessing the resource based on the accepted access request;

a resource access device configured to access the resource based on the access request if the started resource access event is not suspended or canceled;

a suspension device configured to suspend the resource access event prior to access gained by the resource access device when the resource access event is started;

a decision request generation device configured to acquire an access request from the resource access processing and generate an access decision request including the access request during the suspension;

a policy acquisition device configured to acquire an access control policy in an initial stage designated in association with a resource identifier in the attribute management device in advance and an access control policy in a subsequent stage designated in an access control policy in a previous stage when the access decision request is generated;

a first supply device configured to supply the generated access decision request and the acquired access control policy;

an access decision device configured to acquire attribute information from the attribute management device by using a deny-type policy in the access control policy when the supplied access decision request and access control policy are received, and decide permission or denial of the access based on the attribute information and the deny-type policy;

a second supply device configured to supply an access decision response generated to include a result of the decision and further include an obligation-type policy when the obligation-type policy is present in the access control policy used for this decision;

a third supply device configured to supply an obligation execution request including obligation information in an obligation-type policy when a result of the decision in the access decision response represents permission and the obligation-type policy is present in the access decision response;

an obligation execution request device configured to supply an obligation action execution request including an obligation action in obligation information to an obligation execution subject designated in the obligation information in the obligation execution request;

an access subject authentication device as the obligation execution subject, the access subject authentication device being configured to compare a value of an access subject identifier and access subject authentication information acquired from an access subject with a value of an access subject identifier and access subject authentication information which are previously set based on the obligation action execution request, and authenticate that the access subject is valid when both the values and the information coincide with each other;

a fourth supply device configured to write the value of the access subject identifier used for the authentication to the attribute management device and supply an obligation execution result indicative of success of obligation execution when both the values and the information coincide with each other and the authentication is successful, and supply an obligation execution result indicative of failure of the obligation execution when both the values and the information do not coincide with each other and the authentication is unsuccessful;

a designation device configured to designate an access control policy in a subsequent stage for the policy acquisition device based on obligation information of the obligation-type policy in the access decision response when the obligation execution result is indicative of success;

a release device configured to release the suspension if no obligation-type policy is present in the access decision response in a situation where a result of the decision in the supplied access decision response represents permission; and a cancellation device configured to cancel the suspended resource access event when a result of the decision in the supplied access decision response represents denial or when the obligation execution result represents failure.

4. An access control apparatus which controls access to a resource constituted of a document file or an operation execution unit as a control target and is configured to communicate with an external apparatus, comprising:

an attribute management device configured to update and store items of attribute information each including at least a value of a current data item and a value of an access subject identifier;

a first policy storage device configured to store one or more access control policies, each access control policy including: a deny-type policy which represents permission when attribute conditions and an acquisition source of any attribute information are written in advance and attribute information acquired from the attribute management device as the acquisition source meets the attribute conditions, and represents denial when the permission is not represented; and an obligation-type policy which is used when the permission is represented and in which obligation information including designation of an obligation execution subject, an obligation action, and an access control policy in a subsequent stage is written;

a second policy storage device configured to store an access control policy which is designated in any obligation information, the access control policy including a deny-type policy in which attribute conditions including a value of a resource identifier, a value of an action identifier, and a value of an access subject identifier, a resource identifier and an action identifier read from an access decision request, and an access subject identifier read from the attribute management device are written in advance, and which represents permission when the read value of the resource identifier, the read value of the action identifier, and the read value of the access subject identifier coincide with the attribute conditions and represents denial when the permission is not represented, the access control policy including no obligation-type policy;

a request acceptance device configured to accept an access request including a value of a resource identifier indicative of the resource and a value of an action identifier indicative of access request contents with respect to the resource;

an access event starting device configured to start a resource access event for accessing the resource based on the accepted access request;

a resource acceptance device configured to access the resource based on the access request if the started resource access event is not suspended or canceled;

a suspension device configured to suspend the resource access event prior to access gained by the resource access device when the resource access event is started;

a device configured to acquire an access request from the resource access device during the suspension of the resource access event;

a policy acquisition device configured to acquire an access control policy in an initial stage designated in association with a resource identifier in the attribute management device in advance or an access control policy in a subsequent stage designated in an access control policy in a previous stage when the access request is acquired;

a device configured to acquire attribute information from the attribute management device by using a deny-type policy in the acquired access control policy and generate an access decision request including the attribute information and the access request;

a first supply device configured to supply the generated access decision request and the acquired access control policy;

a third supply device configured to supply an obligation execution request including obligation information in an obligation-type policy if a result of decision in an access decision response received from the external apparatus represents permission and the obligation-type policy is present in the access decision response in a situation where, upon receiving the access decision request and the access control policy, the external apparatus executes processing of deciding permission or denial of the access based on the attribute information in the access decision request and the deny-type policy in the access control policy and second supply processing of supplying the access decision response generated to include a result of the decision and further include the obligation-type policy if the obligation-type policy is present in the access control policy used for the decision;

an obligation execution request device configured to supply an obligation action execution request including an obligation action in the obligation information with respect to an obligation execution subject designated in the obligation information in the obligation execution request;

an access subject authentication device as the obligation execution subject, the access subject authentication device being configured to compare a value of an access subject identifier and access subject authentication information acquired from an access subject with a value of an access subject identifier and access subject authentication information which are previously set based on the obligation action execution request, and authenticate that the access subject is valid when both the values and the information coincide with each other;

a fourth supply device configured to write the value of the access subject identifier used for the authentication to the attribute management device and supply an obligation execution result representing success of the obligation execution when both the values and the information coincide with each other and the authentication is successful, or supply an obligation execution result representing failure of the obligation execution when both the values and the information do not coincide with each other and the authentication is unsuccessful;

a designation device configured to designate an access control policy in a subsequent stage for the policy acquisition device based on the obligation information of the obligation-type policy in the access decision response when the obligation execution result represents success;

a release device configured to release the suspension when a result of the decision in the supplied access decision response represents permission and the obligation-type policy is not present in the access decision response; and a cancellation device configured to cancel the suspended resource access event when a result of the decision in the supplied access decision response represents denial or when the obligation execution result represents failure.

* * * * *